(12) United States Patent
Gomon et al.

(10) Patent No.: US 12,489,971 B2
(45) Date of Patent: Dec. 2, 2025

(54) METHODS AND SYSTEMS FOR SYNCHRONIZING IMAGE FRAMES CAPTURED BY A CAMERA ARRAY

(71) Applicant: Verizon Patent and Licensing Inc., Basking Ridge, NJ (US)

(72) Inventors: Igor Gomon, Budd Lake, NJ (US); Vidhya Seran, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 435 days.

(21) Appl. No.: 18/090,744

(22) Filed: Dec. 29, 2022

(65) Prior Publication Data

US 2024/0223893 A1  Jul. 4, 2024

(51) Int. Cl.
*H04N 23/60* (2023.01)
*H04N 23/90* (2023.01)

(52) U.S. Cl.
CPC ........... *H04N 23/665* (2023.01); *H04N 23/90* (2023.01)

(58) Field of Classification Search
None
See application file for complete search history.

(56) References Cited

U.S. PATENT DOCUMENTS

2021/0124939 A1* 4/2021 Krishnamurthy ....... G01S 17/87
2022/0294975 A1* 9/2022 Popovic ........... H04N 21/21805

* cited by examiner

*Primary Examiner* — Eileen M Adams

(57) ABSTRACT

A first capture engine application may synchronize a first clock to a global time domain to which a second clock used by a second capture engine application is also synchronized. The first capture engine application may receive a first image frame having a camera timestamp indicating a capture time of the first image frame with respect to a camera time domain. Based on the camera timestamp and the synchronized first clock, the first capture engine application may annotate the first image frame with a global timestamp indicating the capture time of the first image frame with respect to the global time domain. The first capture engine application may then transmit the annotated first image frame at a same transmission time as the second capture engine application also synchronously transmits a second image frame that is also annotated with the global timestamp. Corresponding methods and systems are also disclosed.

20 Claims, 9 Drawing Sheets

METHODS AND SYSTEMS FOR SYNCHRONIZING IMAGE FRAMES CAPTURED BY A CAMERA ARRAY

BACKGROUND INFORMATION

Groups of image capture devices referred to herein as camera arrays may be configured to capture color and/or depth information for a scene. For instance, a camera array may be used to capture still and/or video images depicting the scene, which may be presented to viewers and/or analyzed and processed for various applications. As one example of such an application, three-dimensional (3D) representations of objects may be generated based on data generated by image capture devices having multiple different vantage points around the objects. As another example, computer vision may be performed to extract information about objects captured in the images and to implement autonomous processes based on this information. These and various other applications of image processing may be used in a variety of entertainment, educational, industrial, agricultural, medical, commercial, robotics, promotional, and/or other contexts and use cases. For instance, extended reality (e.g., virtual reality, augmented reality, etc.) use cases may make use of volumetric models generated based on intensity (e.g., color) and depth images depicting a scene from various vantage points (e.g., various perspectives, various locations, etc.) with respect to the scene.

Synchronizing a camera array (so that the cameras capture images at the same time) may be important for producing quality representations of the scene and the subjects within it for any of these use cases. For example, when images captured from different vantage points are properly synchronized, computing systems may be able to combine the images from the different cameras to create realistic views of the scene being captured and/or accurate models of subjects within that scene. Conversely, poor synchronization may cause images from the different cameras to not be properly aligned, resulting in gaps or inconsistencies in the final output. Inadequate synchronization may also lead to inaccurate representation of the movement of objects and people in the scene, creating choppy and/or disjointed movement in the final representation of the scene and/or the modeled subjects.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF EXAMPLE EMBODIMENTS

Figure 1:
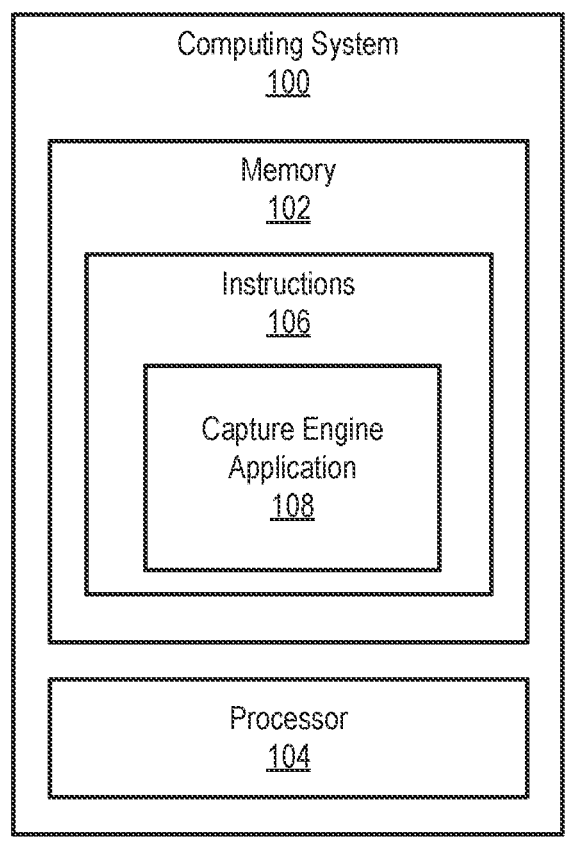
FIG. 1 shows a computing system executing an illustrative capture engine application configured to synchronize image frames captured by a camera array in accordance with principles described herein.

Methods and systems for synchronizing image frames captured by a camera array are described herein. As mentioned above, synchronizing the capture of image frames (e.g., frames depicting a same scene and/or set of objects but that are being captured by different cameras with different vantage points at the scene) may be important for successfully implementing various objectives associated with different use cases (e.g., volumetric modelling of objects at the scene for production of extended reality, etc.). In conventional configurations involving relatively small scenes, limited numbers of cameras, and correspondingly constrained amounts of image frame data, such frame synchronization may be somewhat straightforward. For example, cameras in such a setup could all be directed to synchronously capture images at regular intervals indicated, for example, by a series of pulses or other instructions provided by a capture synchronization controller and received by each camera approximately simultaneously. Each image frame captured in this way may be timestamped by the camera (e.g., to indicate the relevant pulse or instruction that triggered capture of the image frame) and then sent to a single computing system configured to handle intake of all the image data from all the cameras. This computing system may use the timestamps to sort out and correlate the various image frames for further processing by that computing system and/or for transmission to other computing systems configured to perform further image processing with the synchronized image frames.

This type of approach may be suitable for capture setups that are fairly limited in scope. For example, this may serve as a suitable approach for capturing a relatively small scene (e.g., a stage where a small group of people is performing, a studio scene used for generating models of one object at a time, etc.) or handling a relatively modest amount of data generated by a limited number of commodity cameras (e.g., USB cameras that produce limited amounts of data by capturing images with modest resolution, frame rates, etc.). Unfortunately, this conventional approach to frame synchronization does not scale well to more complex capture setups involving larger amounts of image data. For example, synchronization may be much more difficult for a capture setup that involves a relatively large scene (e.g., a playing field associated with a sporting event, a large stage such as for a half-time show event, etc.), a relatively large number of cameras (e.g., dozens or hundreds of cameras), and/or professional cameras configured to produce relatively large amounts of data (e.g., high resolution data such as 8K image data, high frame rate data streams such as 240 fps data streams, etc.).

One element of added complexity, for instance, is that a distributed computing model may be the only way to realistically handle the enormous amount of capture data that a larger capture setup may produce. If no single computing system is available (e.g., due to technical and/or practical/financial constraints) to handle real-time intake and/or processing of the vast amount of capture data being generated by a large camera array, the work may be divided up and distributed to a plurality of different computing systems (e.g., commercial cloud computing systems, multi-access edge compute (MEC) systems accessed by way of a carrier network, a bank of on-premise servers, etc.). Normally, these computing systems would all operate independently from one another. While network communications between the systems may be carried out, significant challenges may be introduced when such independent computing systems are to intake and sort out image frames from the various cameras at the scene. For example, a first computing system (e.g., a single server) may be tasked with handling data received by one camera (e.g., a high-end professional camera that produces image frames with large amounts of data) or a small group of cameras (e.g., lower-end cameras that produce image frames with less data), while a second computing system that may be geographically and/or otherwise functionally distinguished from the first computing system may be tasked with handling data received by another camera or group of cameras in the array. Due to the independence of the computing systems from one another, as well as from the time domain used by the camera array itself, conventional software executing on these computing systems would lack many of the advantages enjoyed by software deployed for simpler capture setups (e.g., where a single software entity on a single server may be responsible for all the data coming in from all the cameras).

To address these challenges, methods and systems described herein for synchronizing image frames may be configured to effectively and efficiently handle all sizes and complexities of capture setups, readily scaling from setups with small scenes and relatively humble camera arrays (i.e., with small numbers of cameras and/or cameras that produce relatively small amounts of image data) to setups with large scenes and highly demanding camera arrays (i.e., with large numbers of cameras and/or sophisticated cameras that produce large amounts of image data). More particularly, methods and systems described herein may operate to synchronize capture engine applications (i.e., software applications configured to handle intake operations for captured image frames) that are distributed arbitrarily to different containers, nodes, clusters, computing systems (e.g., servers), data centers, geographies, computing platforms, and so forth. For example, different instances of a capture engine application described herein may be configured to receive and perform data intake operations for capture data generated by different cameras of the camera array (in some examples, one capture engine application may be configured to serve a small number of related devices such as a color capture device and a depth capture device having approximately the same vantage point). These capture engine applications may be implemented in different containers (or other types of virtualization structures) that may be deployed to different computing systems (e.g., different servers) that may be located in different locations and/or have other significant differences. Consequently, deployment of the capture engine applications may be extremely flexible, thereby making it easy to scale up and down the number of cameras (and the sophistication of the cameras) in a particular capture setup and providing other benefits described herein.

Several aspects of synchronizing distributed capture engine applications (i.e., capture engine applications deployed in a distributed computing environment to different virtualization structures and/or different computing systems as described above) will be described herein. First, capture engine applications described herein may be configured to asynchronously receive image frames that have been synchronously captured in accordance with a camera time domain (e.g., a basic scheme of pulses such as described above) and to annotate the image frames with a timestamp in accordance with a global time domain (e.g., indicating a real time with a time of day, date, etc.). Second, though these image frames may be received from the camera array asynchronously, capture engine applications described herein may be configured to synchronously output the image frames so that downstream processing systems may receive corresponding image frames synchronously and in lockstep. Third, capture engine applications described herein may be configured to provide sufficient buffering to overcome negative effects of jitter and other uncertainty associated with the asynchronous nature of the image frames being received.

All of these aspects of synchronization will be described in relation to capture engine applications that will be understood to be software applications that can be readily deployed to many different types of computing hardware. For example, once a capture engine application is developed, instances of the application may be deployed to different containers running on the same computing system, deployed to different computing systems, or otherwise deployed to a distributed computing architecture (e.g., a commercial cloud computing architecture, etc.) in any manner as may serve a particular implementation. Each of these aspects may involve or be made possible by the use of proprietary or established synchronization protocols. For example, the Precision Time Protocol (PTP) (defined as IEEE 1588) may be employed to synchronize clocks used by different capture engine applications to a global time domain that allow for each of the aspects described above to be successfully accomplished. PTP is a useful synchronization protocol (on which various aspects of methods and systems described herein may be based) at least because PTP is designed to function with various delays and timing uncertainty inherent in standard networks and computing systems (e.g., using standard operating systems rather than real-time operating systems where timing is more tightly controlled at the expense of flexibility and capability). Even with these timing realities, PTP is configured to synchronize clocks within a sub-microsecond range, making it suitable for synchronizing capture engine applications configured to serve even in very demanding scenarios (e.g., receiving capture data from 8K resolution professional cameras capturing 240 fps, etc.).

Various advantages and benefits may be provided by capture engine applications created to synchronize image frames captured by a camera array in accordance with principles described herein. As one example that has already been mentioned, scaling a capture configuration that employs capture engine applications such as described herein may be far easier, more convenient, and more successful than attempts to scale capture configurations employing more conventional synchronization approaches (e.g., approaches not inherently designed for distributed computing architectures). Accordingly, capture engine applications described herein may allow system designers (e.g., producers of extended reality content or other people who may wish to generate volumetric models of a scene for a variety of other use cases) to easily scale systems up and down to use any number of cameras as may best serve a particular situation (e.g., a small number for a small or simple scene, a large number for a large or complex scene, etc.) and to employ cameras of any sophistication level as may be available or as may be appropriate for a given use case (e.g., basic consumer cameras providing relatively low quality in terms of resolution, frame rate, etc.; professional-grade cameras providing much higher quality; etc.).

Moreover, by buffering image frames, annotating them with timestamps relative to a global time domain (e.g., PTP timestamps indicating a real time) and transmitting them synchronously with frames being output by other capture engine applications, capture engine applications described herein may provide significant benefits for downstream systems that are to receive and process the image frames. For example, the synchronization of image frame transmission from the various capture engine applications to downstream applications that are to perform additional image processing (e.g., an application that creates volumetric representations of objects based on the synchronized image frames, etc.) may help ensure that image frames are properly correlated with one another so that the downstream systems can focus on accurately performing their functions without needing to waste bandwidth sorting and correlating image frames they receive. Additionally, certain downstream systems that may be performing functions only marginally related to the captured image frames (e.g., systems producing virtual objects that are to be integrated with volumetric representations of real objects based on the captured image frames) may benefit from operating on a shared global time domain with systems that directly process the image frames, as will be described in more detail below. All these benefits may be provided conveniently with deployment of proper software applications (e.g., capture engine applications described herein) and without additional custom hardware (e.g., custom FPGA synchronization hardware conventionally used to help control USB cameras, etc.).

Various specific implementations will now be described in detail with reference to the figures. It will be understood that the specific implementations described below are provided as non-limiting examples and may be applied in various situations. Additionally, it will be understood that other examples not explicitly described herein may also fall within the scope of the claims set forth below. Methods and systems for synchronizing image frames captured by a camera array may provide any or all of the benefits mentioned above, as well as various additional and/or alternative benefits that will be described and/or made apparent below.

FIG. 1 shows a computing system executing an illustrative capture engine application configured to synchronize image frames captured by a camera array in accordance with principles described herein. More particularly, as shown, a computing system 100 is shown to include a memory 102 representing memory resources configured to store data, as well as a processor 104 representing one or more processors communicatively coupled to the memory resources and configured to execute instructions (e.g., software applications, etc.) to perform functions described herein. Memory 102 is shown to store, possibly with other data not explicitly shown, a set of instructions 106 that, in this example, implement a capture engine application 108 that computing system 100 executes in accordance with principles described herein.

This computing system 100 executing capture engine application 108 may be implemented by computer resources such as processors, memory facilities, storage facilities, communication interfaces, and so forth. For example, as has been mentioned, computing system 100 could be implemented by one or more multi-access edge compute (MEC) server systems operating on a carrier network (e.g., a cellular data network or other carrier network, etc.), cloud compute server systems running containerized applications or other distributed software, on-premise server systems, user equipment devices, or other suitable computing systems as may serve a particular implementation.

A generalized representation of computing system 100 is shown in FIG. 1 to include memory 102 and processor 104, which will be understood to be communicatively coupled to one another. Memory 102 and processor 104 may each include or be implemented by computer hardware that is configured to store and/or execute computer software (e.g., instructions 106, capture engine application 108, etc.). Various other components of computer hardware and/or software not explicitly shown in FIG. 1 (e.g., networking and communication interfaces, etc.) may also be included within computing system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104 to thereby implement one or more instances of capture engine application 108. Memory 102 may be implemented by one or more memory or storage devices, including any memory or storage devices described herein, that are configured to store data in a transitory or non-transitory manner. Instructions 106 may be executed by processor 104 to thereby implement capture engine application 108 (i.e., to cause system 100 to execute an instance of capture engine application 108), which may be configured to perform methods, processes, and/or any other functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may be implemented by one or more computer processing devices, including general-purpose processors (e.g., central processing units (CPUs), graphics processing units (GPUs), microprocessors, etc.), special-purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with synchronizing image frames captured by a camera array in accordance with methods and systems described herein and/or as may serve a particular implementation.

Figure 2:
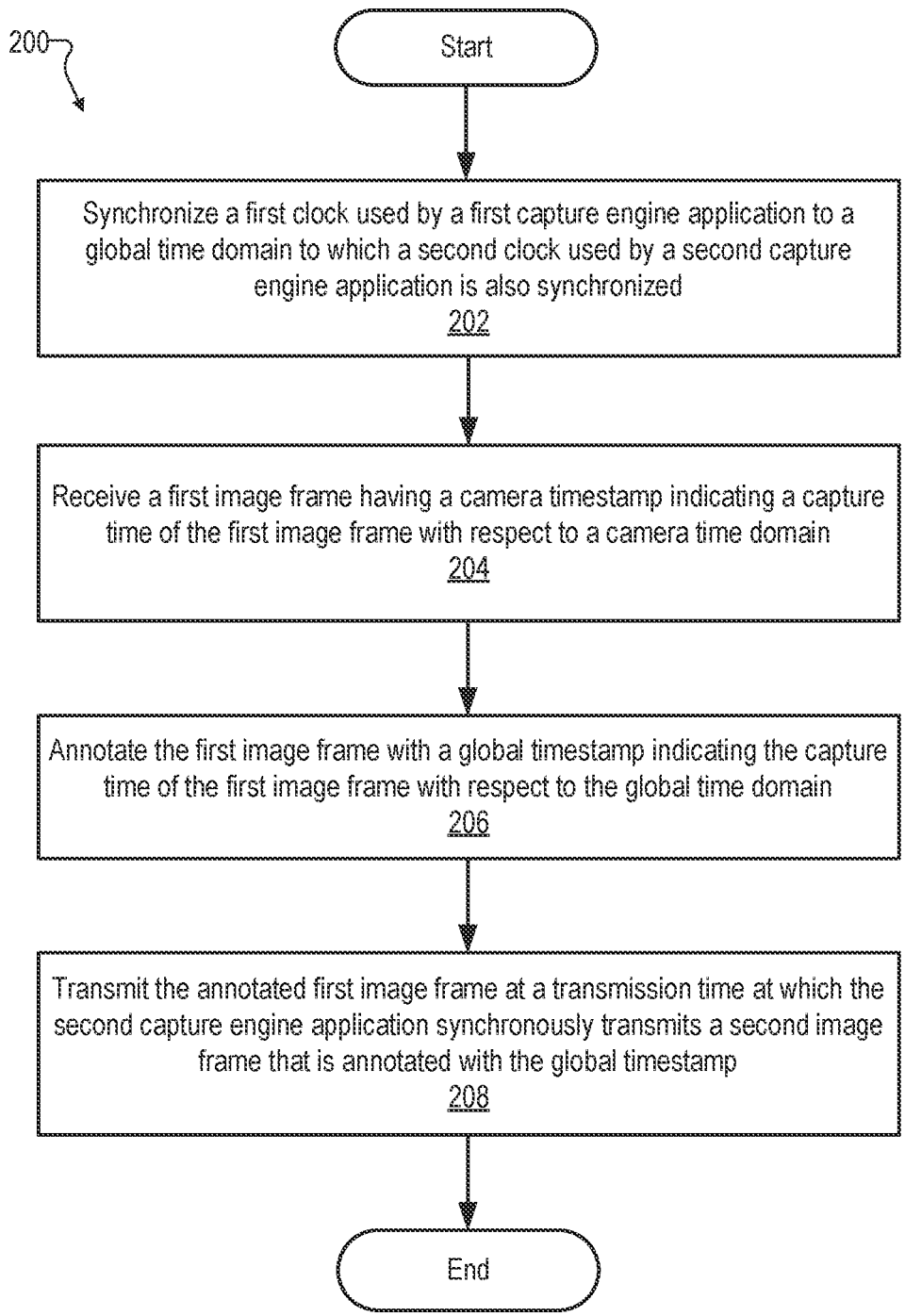
FIG. 2 shows an illustrative method for synchronizing image frames captured by a camera array in accordance with principles described herein.

As one example of functionality that processor 104 may perform, FIG. 2 shows an illustrative method 200 for synchronizing image frames captured by a camera array. While FIG. 2 shows illustrative operations according to one implementation, other implementations may omit, add to, reorder, and/or modify any of the operations shown in FIG.

2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by a software application (e.g., an instance of capture engine application 108) being implemented by a computing system (e.g., an implementation of computing system 100). Actions and functions described as being performed by capture engine application 108 (or a particular instance thereof) will be understood to be performed by various components of computing system 100 (e.g., processor 104) under direction from instructions (e.g., instructions 106 stored in memory 102) that are associated with capture engine application 108.

In certain examples, operations of method 200 may be performed in real time so as to provide, receive, process, and/or use data described herein immediately as the data is generated, updated, changed, exchanged, or otherwise becomes available (e.g., receiving, buffering, timestamping, and transmitting captured image frames as part of a pipeline process that processes and outputs some image frames as other image frames are being captured and introduced into the pipeline). In such examples, certain operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of operations 202-208 of method 200 will now be described in more detail as the operations may be performed by a first capture engine application (e.g., by a first instance of capture engine application 108 that is implemented by processor 104 of system 100 executing instructions 106 stored in memory 102).

At operation 202, the first capture engine application may synchronize a first clock to a global time domain. This first clock may be used by the first capture engine application. For instance, the first clock may be managed by a real-time clock chip that is built into and used by the computing system implementing the first capture engine application (e.g., an implementation of computing system 100). The global time domain may be a time domain that is not localized to the first capture engine application or even to the computing system implementing the first capture engine application, but, rather, is more globally used by multiple computing systems and/or the capture engine applications they implement. For example, a second clock used by a second capture engine application (e.g., a second application implemented by a different computing system in a distributed architecture) may also be synchronized to this global time domain. While these first and second capture engine applications will be referred to in this example method 200 and in various other examples and descriptions below, it will be understood that any number of other clocks used by other capture engine applications implemented by other computing systems may similarly be synchronized to this same global time domain in the same manner as described for the first and second clocks.

In some examples, the global time domain may be associated with the coordinated universal time (UTC) used around the world. For example, the clock may maintain a current date and time of day synchronized to the UTC, or may use a modified time that is based on and synchronized to UTC (e.g., for a particular time zone such as Greenwich Mean Time (GMT) or a time zone in which the camera array and scene described below are located). The synchronizing of the first clock to the global time domain at operation 202 may be performed using the Precision Time Protocol (PTP) (e.g., a protocol defined in IEEE 1588-2008, IEEE 1588-2002, etc.) or another suitable synchronization protocol.

At operation 204, the first capture engine application may receive a first image frame captured by a first camera of a camera array configured to capture image data for a scene. For example, as will be described and illustrated in more detail below, a scene that is to be captured (e.g., a small studio scene, a large playing field where a sporting event is occurring, etc.) may include a variety of subjects (e.g., people, animals, inanimate objects, etc.) that are to be volumetrically represented based on capture data from various vantage points around the scene. Accordingly, if the first capture engine application is associated with (i.e., designated as the capture engine application instance that receives and intakes image frames for) the first camera of the array of cameras, the first image frame may be one of a series of image frames (e.g., video frames being captured by the first camera) that the first camera is providing to the first capture engine application.

When received at operation 204, the first image frame may have a camera timestamp indicating a capture time of the first image frame with respect to a camera time domain used by the camera array. For example, referring to the conventional pulse-based capture synchronization scheme described above, the camera timestamp may be implemented by a pulse identifier (e.g., an integer indicating which pulse, of a plurality of pulses sent by a capture synchronization controller, was the one that triggered the capture of this particular image frame) or other such indication of when the image frame was captured. In this example, the camera timestamp would be useful for correlating when the first image frame was captured in relation to other image frames that it may be correlated with (e.g., in a process that correlates all the image frames triggered by pulse 1, all the image frames triggered by pulse 2, etc.), but it is noted that this type of camera timestamp does not otherwise provide any information indicative of when the first image frame was actually captured (particularly in relation to a more universal time domain such as the global time domain to which the first clock is synchronized at operation 202).

Accordingly, at operation 206, the first capture engine application may annotate the first image frame with a global timestamp indicating the capture time of the first image frame with respect to the global time domain to which the first clock is synchronized at operation 202. The annotating of operation 206 may be performed based on both the camera timestamp and the synchronized first clock. For example, if the capture synchronization controller that generates the pulses to trigger the image frame capture by the array of cameras is synchronized to the global time domain and providing the pulses at known or predetermined times (e.g., times directed by the first capture engine application or known to the first capture engine application), the first capture engine application may determine a respective time, in the global time domain, when each pulse was generated by the capture synchronization controller. Accordingly, when an image frame such as the first image frame is received, the first capture engine application may annotate the image frame to indicate when it was captured with respect to the global time domain.

In some examples, the global timestamp annotated on the first image frame at operation 206 may be implemented as a PTP timestamp representing the capture time as a real time indicating a date and time of day. For example, the global timestamp may indicate a UTC time (e.g., with respect to a particular time zone such as GMT or the time zone where the scene and camera array are located). Because of the high degree of accuracy that PTP is able to achieve when synchronizing clocks (e.g., the first and second clocks, the clock used by the capture synchronization controller, etc.), a PTP timestamp implementing the global timestamp may indicate the capture time of the first image frame with sub-microsecond precision (i.e., accuracy and precision in the nanosecond range). As has been mentioned, a high degree of precision may be useful particularly with high frame rates used by certain cameras (e.g., 240 fps rates used by sophisticated professional-grade video cameras) and a high degree of accuracy may be useful particularly when annotated image frames are used or referenced by downstream systems that are managed by different entities but synchronized to the same global time domain.

At operation 208, the first capture engine application may transmit the annotated first image frame (i.e., the first image frame as annotated at operation 206). More particularly, the first capture engine application may use the synchronized first clock to transmit the annotated first image frame at a designated time at which other corresponding annotated image frames are also being transmitted. For example, the first capture engine application may transmit the annotated first image frame at a transmission time at which the second capture engine application synchronously transmits a second image frame that is also annotated with the global timestamp and is captured by a second camera of the camera array. Due to a jitter buffer and a streaming start mechanism described in more detail below (features that also rely on the clocks used by the capture engine applications being synchronized to the global time domain), this synchronous transmission of the first and second image frames (as well as other corresponding image frames captured by other cameras in the camera array and transmitted by other distributed capture engine applications) may be accomplished even though the raw version of the first image frame (i.e., prior to annotation with the global timestamp) may have been received from the first camera asynchronously with the other corresponding image frames (e.g., asynchronously with the second image frame being received from the second camera).

Figure 3:
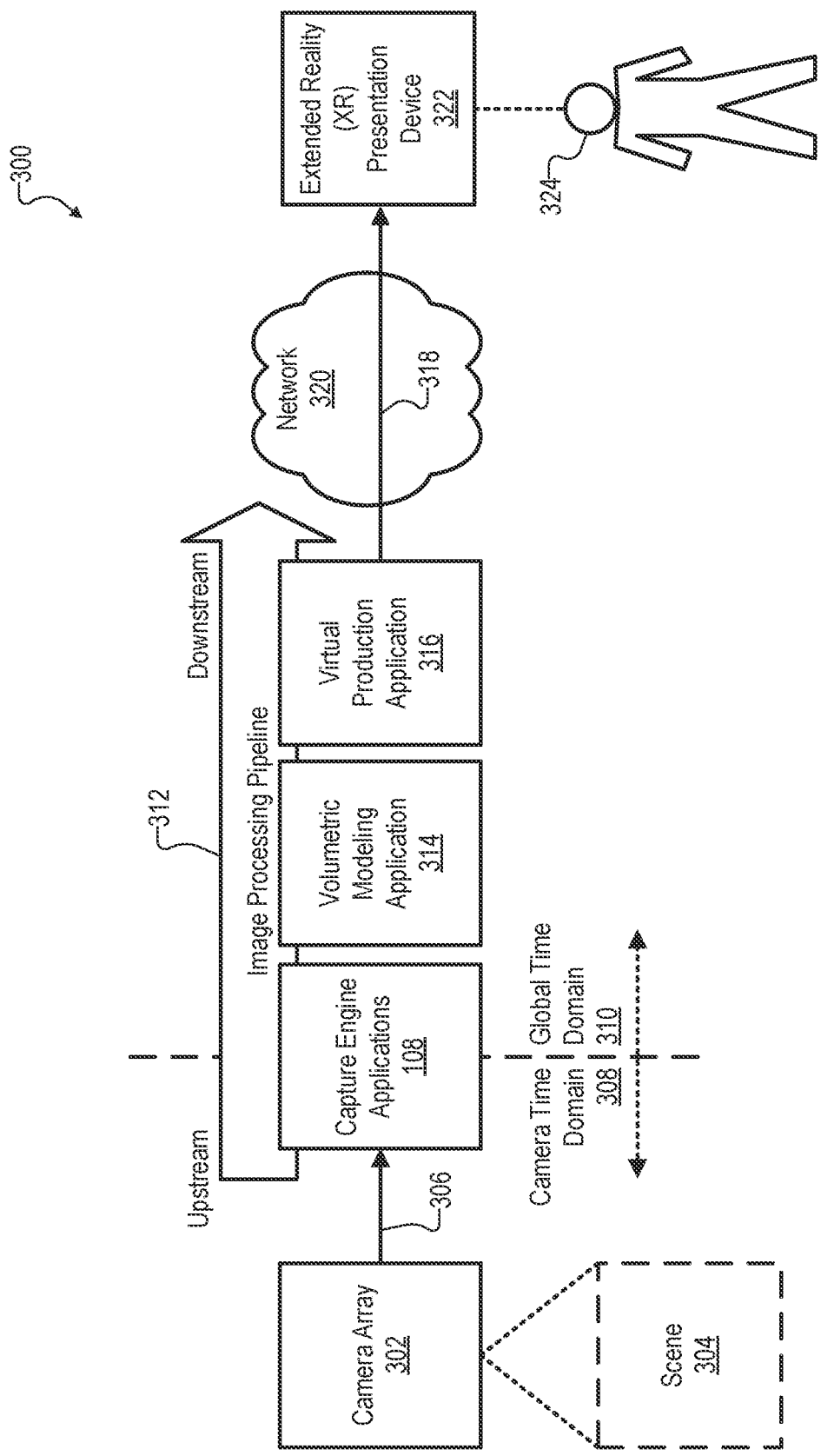
FIG. 3 shows an illustrative configuration in which capture engine applications may operate to synchronize image frames captured by a camera array for an extended reality production use case.

FIG. 3 shows an illustrative configuration 300 in which capture engine applications may operate to synchronize image frames captured by a camera array for an extended reality production use case. As shown, FIG. 3 includes a plurality of instances of capture engine application 108 (not individually broken out in FIG. 3), each of which may be configured to operate in the same or similar ways as described above in relation to FIGS. 1 and 2. Additionally, configuration 300 shows a camera array 302, which will be understood to include a plurality of cameras (not individually shown in FIG. 3) configured to capture imagery from various vantage points with respect to a scene 304. Image data 306 is shown to be produced by camera array 302 and provided to the various capture engine applications 108 for the purpose of synchronizing the image frames, including by converting them from a camera time domain 308 to a global time domain 310 (e.g., by annotating each image frame with a global timestamp as described above).

Image data 306 may represent a plurality of image frames captured by the various cameras of camera array 302 (each referred to individually as a camera 302) from various vantage points that the cameras have with respect to scene 304. As shown, this image data 306 may be provided to an image processing pipeline 312 that begins, at an upstream stage of the pipeline, with the capture engine applications 108 configured to intake and synchronize the image frames and that continues to applications at various downstream stages including, in this example, a volumetric modeling application 314 and a virtual production application 316. It will be understood that, in certain implementations, other applications that are configured to perform other functions may also be included at stages of image processing pipeline 312 not explicitly shown in FIG. 3. Ultimately, the applications of the image processing pipeline 312 may work together to produce extended reality content 318 based on image data 306 captured at scene 304 and/or based on other data not explicitly shown (e.g., data from which virtual objects not actually present at scene 304 may be generated). As shown, extended reality content 318 may then be provided by way of a network 320 to an extended reality (XR) presentation device 322 used by a user 324 to engage in an extended reality experience based on the extended reality content.

While configuration 300 represents one particular use case in which capture engine applications may be used to synchronize image frames captured by a camera array (i.e., a specific extended reality use case in which image data 306 representing objects in scene 304 is used to generate volumetric representations of the objects for use in presenting an extended reality experience to user 324), it will be understood that capture engine applications 108 may similarly be used for various other use cases as may serve a particular implementation. For example, implementations of capture engine applications 108 may be used to synchronize image frames that are not captured for the purpose of generating extended reality content but rather are aimed at more general computer vision applications, object modeling applications, or the like. Indeed, implementations of capture engine application 108 and other stages described herein for image processing pipeline 312 may be employed for any suitable image processing use case in a wide array of fields including, but not limited to, entertainment, education, manufacturing, medical imaging, robotic automation, and so forth. Thus, while configuration 300 and various examples described and illustrated herein use volumetric object modeling and extended reality content production as an example use case, it will be understood that configuration 300 may be modified or customized in various ways to suit any of these other types of use cases. Each of the elements of configuration 300 will now be described in more detail.

Camera array 302 may include a plurality of image capture devices (referred to herein as cameras 302) configured to capture various types of image data (e.g., color data, intensity data, depth data, etc.) associated with scene 304 and objects included therein (i.e., objects present at the scene). For instance, camera array 302 may include a synchronized set of video cameras that are each oriented toward scene 304 and configured to capture color images depicting objects at the scene. Additionally, the same video cameras (or distinct depth capture devices associated with the video cameras) may be used to capture depth images of the objects at the scene using any suitable depth detection techniques (e.g., stereoscopic techniques, time-of-flight techniques, structured light techniques, etc.). As will be illustrated in more detail below, each of the cameras of camera array 302 (e.g., each image capture device or composite pair of devices configured to capture both color and depth data) may have a different pose (i.e., position and orientation) with respect to the scene being captured (i.e., scene 304 in this example). These different poses of the cameras 302 may provide for a variety of different vantage points of the scene and may be selected, for example, to provide coverage of the scene, or at least of a particular volumetric capture zone within the scene (not explicitly shown in FIG. 3), from various perspectives around the scene so that each object at the scene may be volumetrically modeled in ways described below. For instance, in one example, cameras of camera array 302 could be arranged in a circle around scene 304 and could be oriented to face inward toward a center of that circle, while in other examples, the cameras could be arranged in other suitable shapes and configurations (e.g., lined along the four edges of a large rectangular playing field to capture a sporting event played on the field, etc.).

Scene 304 (also referred to as a capture scene) represents any real-world area for which image data is captured by camera array 302. Scene 304 may be any suitable size from a small indoor studio space to a large outdoor field or larger space, depending on the arrangement and number of cameras included in camera array 302. As will be illustrated and described in more detail below, certain scenes 304 may include or otherwise be associated with a particular volumetric capture zone that is defined with an explicit boundary to guarantee a minimum level of coverage by camera array 302 (e.g., coverage from multiple perspectives around the zone) that may not necessarily be provided outside of the zone. Typically, scene 304 may include one or more objects (not shown in FIG. 3) that are of interest for purposes of the relevant use case and that are to be volumetrically modeled (e.g., for presentation in an extended reality experience or the like). For example, scene 304 may include a set of human subjects that are to be volumetrically modeled for presentation as part of extended reality content 318. In one example, scene 304 could include a playing field on which a sporting event is taking place and objects of interest within scene 304 could be a set of players engaged in the sporting event on the playing field. In other examples, scene 304 could be implemented in other ways, such as by including a stage where a concert or theatrical performance is taking place, a set for a film or television show where actors are performing, or the like. In any of these examples, a volumetric representation of one or more objects within scene 304 may be generated and provided as part of an extended reality content stream or in another suitable manner.

Image data 306 may represent image frames (e.g., color or intensity image frames, depth image frames, combination color/depth (RGBD) image frames, etc.) that are generated and provided by the various cameras of camera array 302 and that depict scene 304 and objects included therein. For example, the objects depicted with color and depth data in the image frames of image data 306 may be objects of interest for volumetric modeling (e.g., human subjects and so forth, as described above). As shown, image data 306 may be provided to image processing pipeline 312 at an upstream stage implemented by respective capture engine applications 108 for each camera 302 of the array. As has been described and as will be further laid out in additional detail below, capture engine applications 108 may be configured to receive and intake image data 306, including by converting the image frames of image data 306 from camera time domain 308 to global time domain 310 and synchronizing the transmission of each set of image frames to downstream stages of the pipeline (e.g., to volumetric modeling application 314 in this example).

Camera time domain 308 may represent a time domain used by camera array 302 to synchronize the capture of scene 304 by the various cameras 302 posed at the various locations around scene 304. As mentioned above, this camera time domain may be localized to the camera array (i.e., such that other systems and applications outside of camera 302 are do not use camera time domain 308) and may not necessarily be associated with a real time indicating a date, a particular time of day, and the like. Rather, in certain examples, camera time domain 308 may be a discrete time domain that is defined by a set of pulses that are configured to trigger synchronous capture of scene 304 by the cameras of camera array 302 (e.g., pulses produced by a capture synchronization controller such as will be described and illustrated in more detail below). As such, camera timestamps associated with captured image frames of image data 306 (i.e., timestamps indicating the capture time of the image frames with respect to camera time domain 308) may not indicate a real time that has meaning outside of the localized camera time domain 308. Rather, these camera timestamps may indicate, for a particular timestamped image frame, a particular pulse identifier (indicative of the pulse that triggered the capture of that frame) or a particular timeslot of a discrete sequence of timeslots (e.g., occurring approximately every 33 ms for 30 fps, occurring approximately every 4 ms for 240 fps, etc.) during which the frame was captured. This camera timestamp may indicate a precise moment (e.g., with sub-microsecond accuracy) when the timestamped image frame (and other correspond image frames) were captured in relation to one another, but may not provide any context for when that moment was with respect to a real time or to any time that would be understood by most of the applications in the pipeline (with the exception of capture engine applications 108, as has been described).

In contrast, global time domain 310 may represent a real time domain used by capture engine applications 108 as well as other systems included in image processing pipeline 312 (e.g., volumetric modeling application 314, virtual production application 316, etc.). As has been mentioned, global time domain may be associated with a universal time standard such as UTC. In the implementation shown in configuration 300, one function of capture engine applications 108 is therefore to convert image frames from camera time domain 308 (which may be meaningless to all systems other than the camera array, as described above) to global time domain 310 (which may be meaningful to and used by all the other systems). This may be done by replacing the camera timestamp (with respect to camera time domain 308) with a global timestamp (with respect to global time domain 310) or by annotating the image frame to add the global timestamp (without modifying the camera timestamp such that both timestamps are included in the image frame thereafter). In certain implementations different from configuration 300, the cameras of camera array 302 could be synchronized (e.g., using PTP or the like) to also use a universal time domain such as global time domain 310 so that no conversion between time domains would be performed.

Image processing pipeline 312 is illustrated in configuration 300 by a large block arrow that overlaps with a plurality of different software applications that will be understood to make up certain stages of the pipeline. As indicated, image processing pipeline 312 may start at an upstream end at the base of the arrow, where image frames (and/or other data such as metadata) may be input to the pipeline and passed from stage to stage (e.g., from application to application) in a downstream direction (toward the end of the arrow to the right) to gradually be processed by each of the applications shown. While three particular stages associated with three particular applications are explicitly shown in configuration 300 (i.e., stages associated with capture engine application 108, volumetric modeling application 314, and virtual production application 316), it will be understood that more, fewer, or different stages may be included in the pipeline as may serve a particular implementation.

In this implementation, the transmitting of annotated image frames by the various capture engine applications 108 is shown to include transmitting the annotated image frames from a first stage of image processing pipeline 312 represented by the capture engine applications 108 to downstream stages of image processing pipeline 312 represented by volumetric modeling application 314 and then by virtual production application 316. These downstream stages will be understood to be image analysis applications distinct from the capture engine applications 108, and may include, as shown, volumetric modeling application 314, virtual production application 316, and/or any other suitable applications as may serve a particular use case.

Volumetric modeling application 314 may be configured to generate, based on image data 306 captured by camera array 302 (and as annotated and synchronized by capture engine applications 108), one or more volumetric models associated with scene 304 (e.g., with objects included in the scene, etc.). In some examples, volumetric modeling application 314 may be managed by (e.g., owned by, developed by, maintained by, and/or otherwise under control of) a first entity that also manages capture engine applications 108 and/or camera array 302. For example, this first entity may set up and configure the cameras at the scene and provide hardware and software configured to generate volumetric representations of objects at the scene based on imagery captured by the cameras. As with other software applications described herein, volumetric modeling application 314 may be implemented by any suitable computing system (e.g., a MEC server, a cloud server, an on-premise server, a user equipment device, etc.) that is configured to generate volumetric representations of objects based on image data 306 that is captured by camera array 302.

Virtual production application 316 may be configured to generate virtual objects to be integrated (e.g., along with the one or more volumetric models produced by volumetric modeling application 314) in an extended reality experience presented to a user. As such, and as the final stage in this example implementation of image processing pipeline 312, virtual production application 316 may generate extended reality content 318 that may be provided (e.g., by way of network 320) to XR presentation device 322. After passing through both volumetric modeling application 314 and virtual production application 316, this extended reality content 318 may include both 1) volumetric representations of real objects present at scene 304, and 2) virtual representations of virtual objects that are not actually present at scene 304 (though they may appear to be present when the extended reality content is experienced by user 324). In some implementations, virtual production application 316 may be managed by a second entity different from the first entity. That is, the virtual objects inserted into extended reality content 318 may be designed and generated separately (e.g., using software developed by different people or companies, etc.) from the volumetric models of the real objects that are also included in extended reality content 318. As mentioned above, because the first and second entities may be different from one another (as well as because all these systems may be distributed to different containers, computing systems, and even geographies, as has been described), it may be especially useful for all of the applications to use the same time domain (i.e., global time domain 310). By being on this same global time domain 310, for example, virtual objects and volumetric representations of real objects may all be integrated into a single, unified, coherent extended reality experience represented by extended reality content 318.

Extended reality content 318 may be represented by a data stream generated by image processing pipeline 312 (e.g., output by the most downstream stage, which, in this example, happens to be virtual production application 316). Extended reality content 318 may include volumetric content (e.g., volumetric representations of objects at scene 304, etc.), virtual content (e.g., virtual objects inserted into the stream so as to appear to interact with or otherwise relate to the volumetric representations) and/or other data (e.g., metadata, etc.) useful for presenting the extended reality content. As shown, a data stream encoding extended reality content 318 may be transmitted by way of network 320 to XR presentation device 322 so that extended reality content 318 may be presented by the device to user 324. Extended reality content 318 may include any number of volumetric representations of objects, virtual objects, and/or other such content that allows the content, when presented by XR presentation device 322, to provide user 324 with an extended reality experience involving the volumetric and virtual object representations. For example, if scene 304 includes a playing field where a sporting event is taking place and the objects represented volumetrically in extended reality content 318 are players involved in the sporting event, the extended reality experience presented to user 324 may allow user 324 to immerse himself or herself in the sporting event such as by virtually standing on the playing field, watching the players engage in the event from a virtual perspective of the user's choice (e.g., right in the middle of the action, etc.), and so forth. Virtual objects not actually present at scene 304 (e.g., informational or promotional 3D content appearing to be hovering near the players, etc.) may also be integrated into the presentation and would be observed and experienced by the user 324 in the same way.

Network 320 may serve as a data delivery medium by way of which data may be exchanged between a server domain (in which camera array 302 and image processing pipeline 312 and its various stages are included) and a client domain (in which XR presentation device 322 is included). For example, network 320 may be implemented by any suitable private or public networks (e.g., a provider-specific wired or wireless communications network such as a cellular carrier network operated by a mobile carrier entity, a local area network (LAN), a wide area network, the Internet, etc.) and may use any communication technologies, devices, media, protocols, or the like, as may serve a particular implementation.

XR presentation device 322 may represent any device used by user 324 to experience extended reality content 318 produced by image processing pipeline 312 and received by way of network 320. For instance, in certain examples, XR presentation device 322 may include or be implemented by a head-mounted extended reality device that presents a fully-immersive virtual reality world, or that presents an augmented reality world based on the actual environment in which user 324 is located (but adding additional augmentations such as object representations produced and provided by volumetric modeling application 314 and/or virtual production application 316). In other examples, XR presentation device 322 may include or be implemented by a mobile device (e.g., a smartphone, a tablet device, etc.) or another type of media player device such as a computer, a television, or the like.

A generalized embodiment of a computing system implementing an illustrative capture engine application configured to synchronize image frames captured by a camera array has been described in relation to FIG. 1, a generalized method or process for synchronizing image frames captured by a camera array has been described in relation to FIG. 2, and an example configuration in which capture engine applications described herein may operate to perform such a method within a context of an extended reality use case has been described in relation to FIG. 3. Additional aspects and details associated with such systems, applications, methods, and configurations will now be described in relation to FIGS. 4-8.

Figure 4:
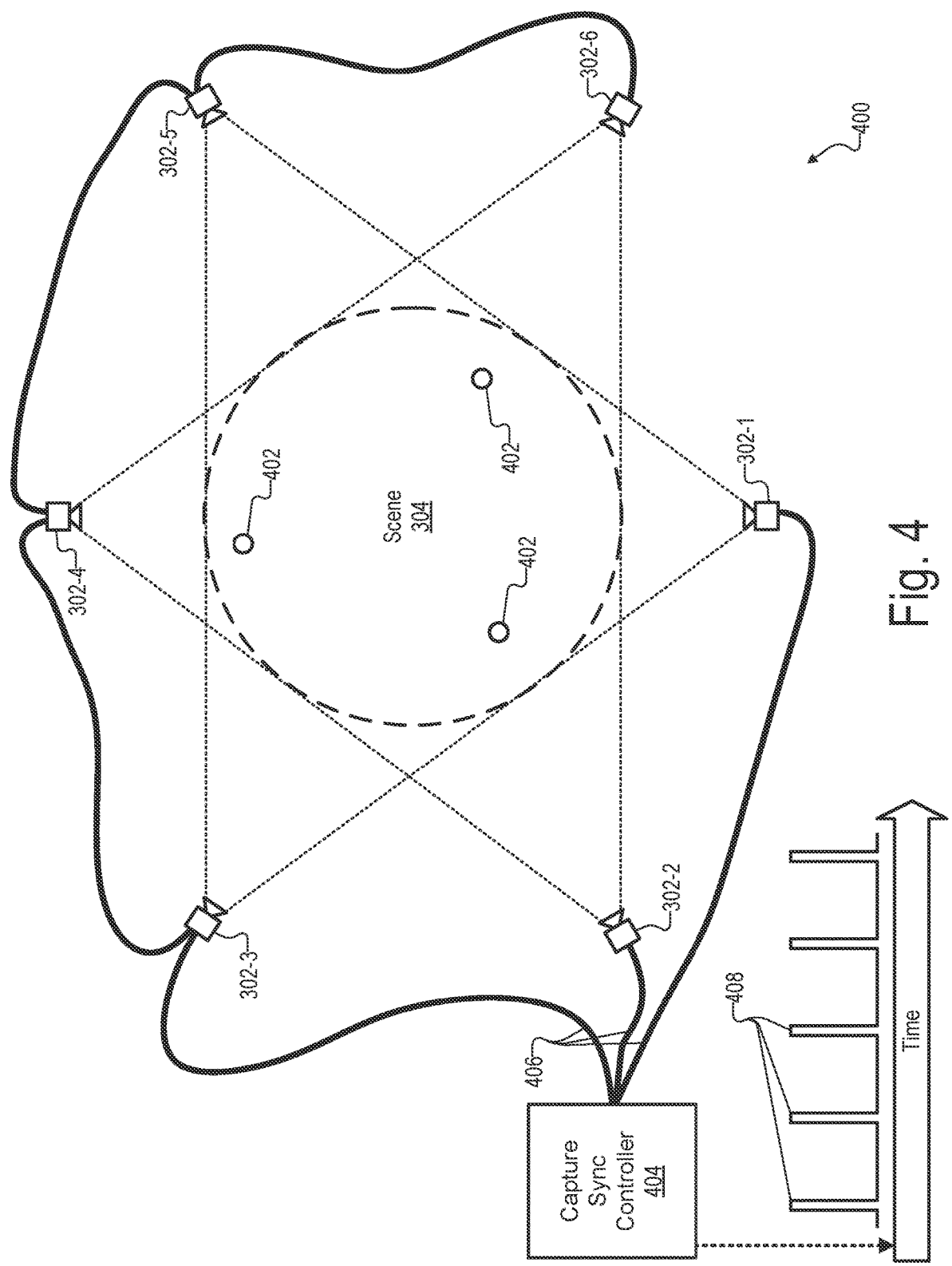
FIG. 4 shows an illustrative capture setup in which an example camera array synchronously captures images of objects at a scene under direction from a capture synchronization controller operating in a camera time domain.

FIG. 4 shows an illustrative capture setup 400 (from a top view) in which camera array 302 (including six cameras labeled 302-1 through 302-6 in this example) synchronously captures images of various objects 402 at scene 304 under direction from a capture synchronization controller 404 (labeled "capture sync controller 404") operating in camera time domain 308. Each of cameras 302 may be implemented by a camera that is suitable for the particular use case being implemented. For example, if high quality (e.g., high resolution, a high frame rate, etc.) is a priority for a particular use case, high-quality, professional-grade cameras supporting, for example, 8K resolution and/or 240 fps frame rates may be used. Conversely, if setup cost is a priority and quality is not as important for a given use case, USB cameras that are of lower quality but that are less costly and more straightforward to set up and control could be used. Different cameras with different levels of robustness/ruggedness may also be selected to suitably serve various types of implementations and/or use cases (e.g., indoor vs. outdoor implementations, etc.).

As shown, scene 304 is demarcated by a circular dashed line in FIG. 4. In this example, scene 304 is shown to be circular scene surrounded by a set of six cameras 302 (i.e., cameras 302-1 through 302-6) that are distributed at equal intervals around the scene. Camera array 302 will be understood to be set up so as to capture image data representative of scene 304. To illustrate, each camera 302 is shown to be oriented toward a center of the circular scene 304 and dotted lines emanating from each camera 302 and representing a field of view of the camera is shown to be as wide as scene 304 so as to capture imagery of scene 304 from the particular pose and vantage point that the camera has. Accordingly, as described above and as illustrated more specifically in the example of capture setup 400, cameras 302 may be collectively arranged to capture scene 304 from various angles and perspectives, such that information about many sides of any object 402 present within scene 304 can be effectively gathered. It will be understood that, prior to or concurrent with volumetric content being generated using image data 306 produced by camera array 302, the camera array may be calibrated in any manner as may serve a particular implementation.

Objects 402 may represent any types of objects present at scene 304. For example, such objects could be subjects that are to be volumetrically modeled (e.g., people, animals, certain types of inanimate objects, etc.), parts of the scenery visible at the scene or in the background, and/or any other objects at the scene. As one example, if scene 304 is implemented as a playing field where a sporting event is taking place, objects 402 could include players and referees on the field, one or more balls or other objects used to play the game, and so forth.

Also shown in FIG. 4 is capture synchronization controller 404, which is shown to be communicatively coupled (e.g., physically and electrically connected) to cameras 302 by way of cables 406. Capture synchronization controller 404 may provide a series of pulses 408 indicating when each of the cameras 302 is to capture an image. For example, on each rising edge of the pulse train including pulses 408, each camera 302 may synchronously capture an image that, once captured, will be sent to the respective capture engine application associated with that camera 302 (e.g., with a camera timestamp indicating which of the pulses 408 triggered the capture, as has been described).

Capture synchronization controller 404 may be implemented in any suitable manner. For example, in some implementations, capture synchronization controller 404 may include or be implemented by custom hardware, such as an FPGA configured to generate pulses 408 in accordance with a predetermined frequency (e.g., associated with a particular frame rate). As another example, capture synchronization controller 404 may be integrated with and/or otherwise implemented by one of cameras 302 (e.g., a "master" camera that is configured to set the capture pace and control the other cameras) or another suitable system.

In FIG. 4, cables 406 are shown to be routed directly from capture synchronization controller 404 to certain cameras 302 (e.g., cameras 302-1 through 302-3) while being routed to other cameras 302 (e.g., cameras 302-4 through 302-6) by way of daisy chaining through other cameras. It will be understood that direct routing or daisy chaining (or a combination of the two such as shown in FIG. 4) may each be suitable ways of configuring certain capture setups, though it will also be understood that stricter limitations (e.g., faster frame rates, etc.) may call for cables 406 to be configured in certain ways to achieve suitable synchronization. For example, for a capture setup with a high frame rate and cameras 302 that are spaced relatively far apart, it may be desirable to route cables 406 directly to each camera 302 and/or to match the lengths of the various cables 406 (i.e., so that pulse signals have the same distance to travel), and so forth.

Figure 5:
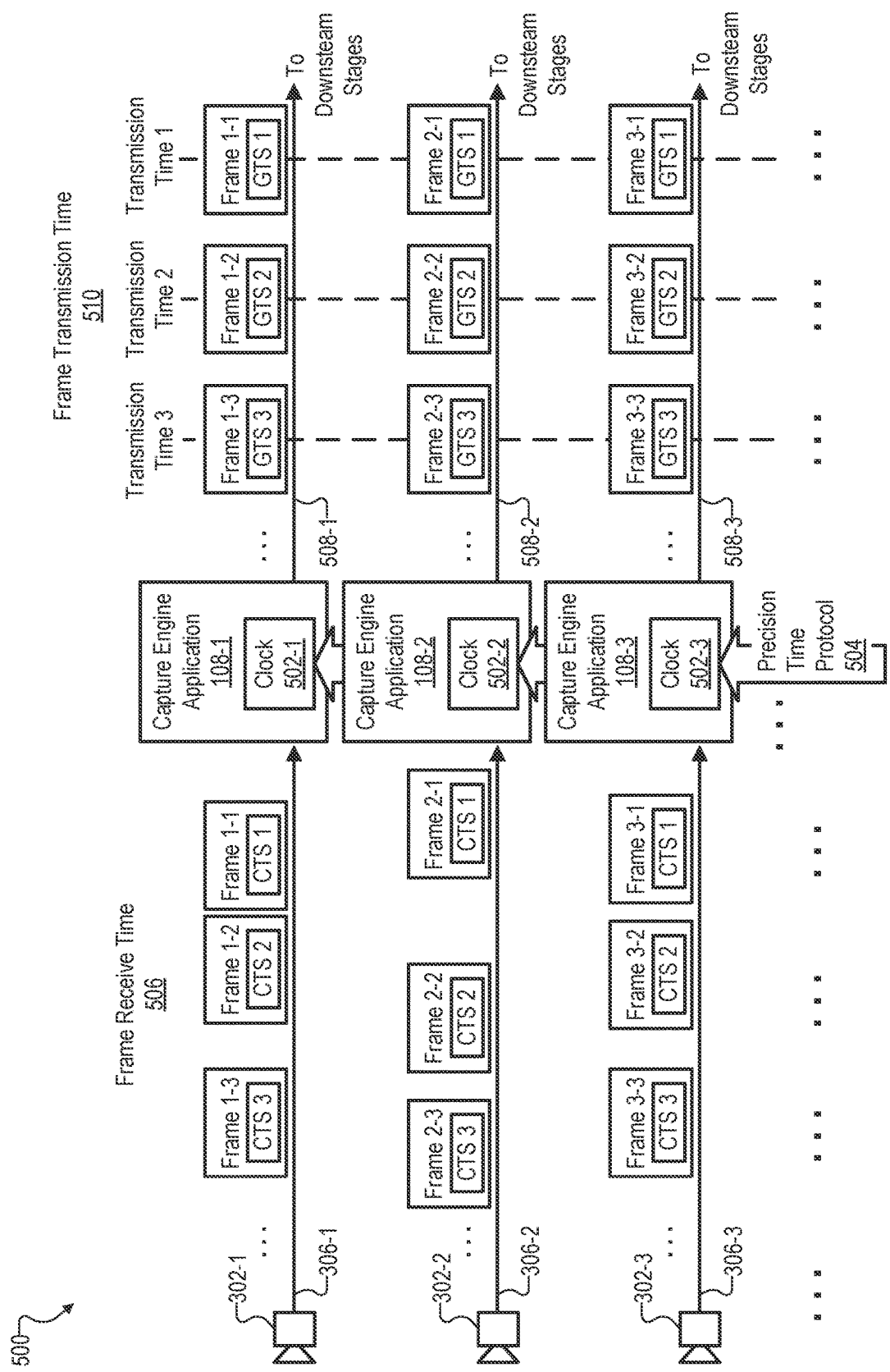
FIG. 5 shows illustrative aspects of how capture engine applications described herein may operate to synchronize image frames captured by a camera array and to prepare the image frames for processing in a global time domain.

FIG. 5 shows illustrative aspects of how capture engine applications described herein may operate to synchronize image frames captured by a camera array and to prepare the image frames for processing in a global time domain. Specifically, FIG. 5 illustrates an example frame synchronization 500 in which a few of the cameras from camera array 302 (i.e., cameras 302-1, 302-2, and 302-3 in this example, though ellipses indicate that more of the cameras 302 may be also understood to be handled in the same way) are shown to provide image data 306 to respective capture engine applications 108 (i.e., capture engine application 108-1 receiving image data 306-1 from camera 302-1, capture engine application 108-2 receiving image data 306-2 from camera 302-2, capture engine application 108-3 receiving image data 306-3 from camera 302-3, etc.). As shown, the respective streams of image data 306 from the various cameras 302 include image frames that are illustrated as boxes labeled "Frame [X]-[Y]" where 'X' is an integer corresponding to the camera providing the image frame and 'Y' is an integer corresponding to a unique identifier distinguishing the image frame from the others. Thus, for example, image data 306-1 is shown to include various image frames labeled "Frame 1-1," "Frame 1-2," "Frame 1-3," and an ellipsis indicated that additional frames may also be provided by camera 302-1 in the sequence.

Each image frame included within a particular stream of image data 306 is shown to include a camera timestamp (abbreviated "CTS") indicating when the image frame was captured in relation to a camera time domain (e.g., camera time domain 308). These timestamps are labeled as "CTS [Y]" where 'Y' aligns with the unique identifier described above and will be understood to indicate a particular time when the image frame was captured. For example, the "CTS 1" timestamp (i.e., the timestamp shown to be included within Frame 1-1, Frame 2-1, and Frame 3-1) may correspond to a time that a first pulse 408 of a synchronization signal (e.g., pulse train) generated by capture synchronization controller 404 was received by the cameras 302 to trigger the synchronous capture of these particular image frames (i.e., Frames [X]-1). Similarly, the "CTS 2" timestamp shown to be included within Frame 1-2, Frame 2-2, and Frame 3-2 may correspond to a time that a second pulse 408 of the synchronization signal was received by the cameras 302 to trigger the synchronous capture of these particular image frames (i.e., Frames [X]-2), and so forth.

As has been described above, various capture engine applications 108 may input these respective streams of image data 306 from the respective cameras 302 and may perform various operations based on the image frames received thereby. To this end, each of the capture engine applications 108 shown in FIG. 5 is shown to use a respective clock 502 (i.e., a clock 502-1 used by capture engine application 108-1, a clock 502-2 used by capture engine application 108-2, and a clock 502-3 used by capture engine application 108-3, etc.) that are each synchronized to a global time domain (e.g., global time domain 310) using Precision Time Protocol (PTP) 504. As has been described, based on the capture timestamps of the incoming image frames and the time kept by these clocks 502, each capture engine application 108 may annotate outgoing versions of the image frames (image frames being transmitted to downstream stages) with global time stamps (abbreviated "GTS" in FIG. 5). As mentioned above, these global timestamps may replace the camera timestamps (as shown in the example of FIG. 5), or may be added in addition to the camera timestamps, and may be implemented as PTP timestamps representing the respective capture times as real times (e.g., indicating a date and time of day with sub-microsecond precision, etc.).

Limitations of computing systems with regard to how much image data they can receive and process were described above. As a result of such limitations, even a very powerful, high-end computing system is limited in how many streams of image data from different cameras it can successfully intake and keep up with. For example, if cameras 302 are implemented by sophisticated cameras that generate large numbers of high quality frames every second, even a very powerful computing system may struggle to handle more than one or a small handful of image data streams, thereby requiring the use of a distributed computing model to scale up a capture system to make use of a large number of such cameras. To facilitate the scaling of capture setups and the use of distributed computing models in response to these types of limitations, FIG. 5 shows that each camera 302 and its respective stream of image data 306 is associated one-to-one with a dedicated capture engine application 108 configured to intake and prepare the image frames from that image data stream. Specifically, as shown, each individual camera 302 in the camera array (e.g., including cameras 302-1, 302-2, and 302-3 shown in FIG. 5) may be associated with a different respective capture engine application 108 configured to receive and annotate capture data generated by the individual camera (e.g., capture engine application 108-1 configured to receive and annotate capture data generated by camera 302-1, capture engine application 108-2 configured to receive and annotate capture data generated by camera 302-2, etc.).

This one-to-one association between cameras and capture engine applications may allow for great flexibility in how and where capture engine applications are deployed. For example, computing systems configured with various types of architectures (e.g., distributed computing architectures, etc.) may be used to host these capture engine applications in ways that make it easy and convenient to scale up and down the number of cameras being used, the amount of data being processed, and so forth.

Figure 6B:
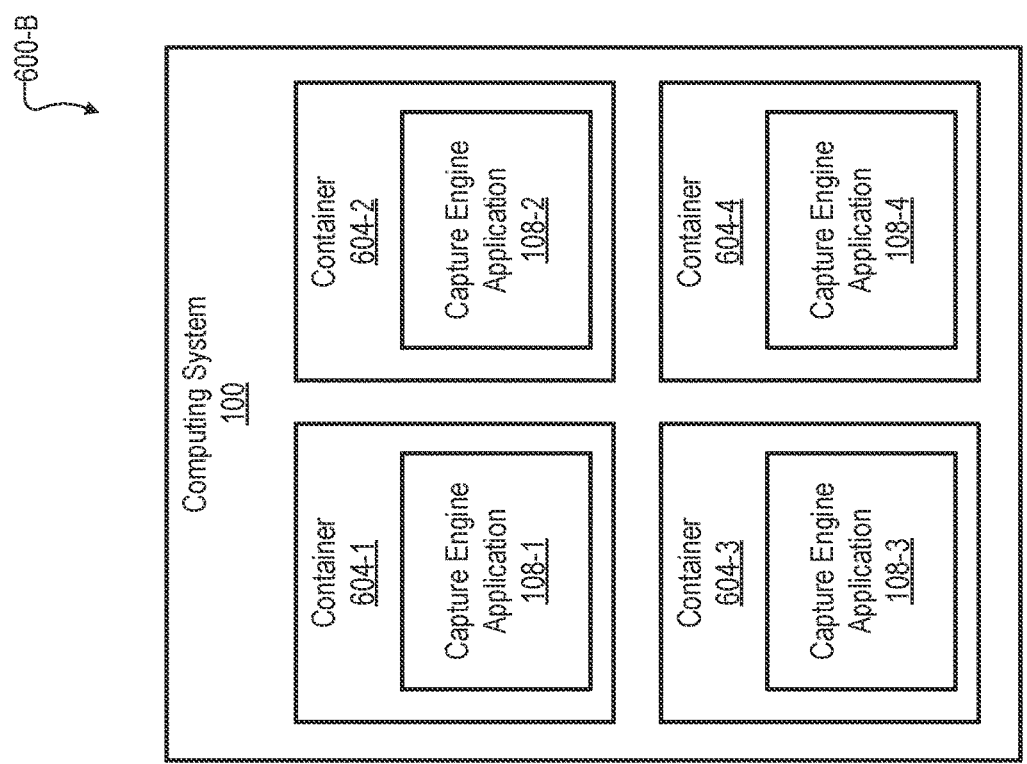
FIGS. 6A-6B show different illustrative deployments of capture engine applications described herein to computing systems configured to execute the capture engine applications.
Figure 6A:
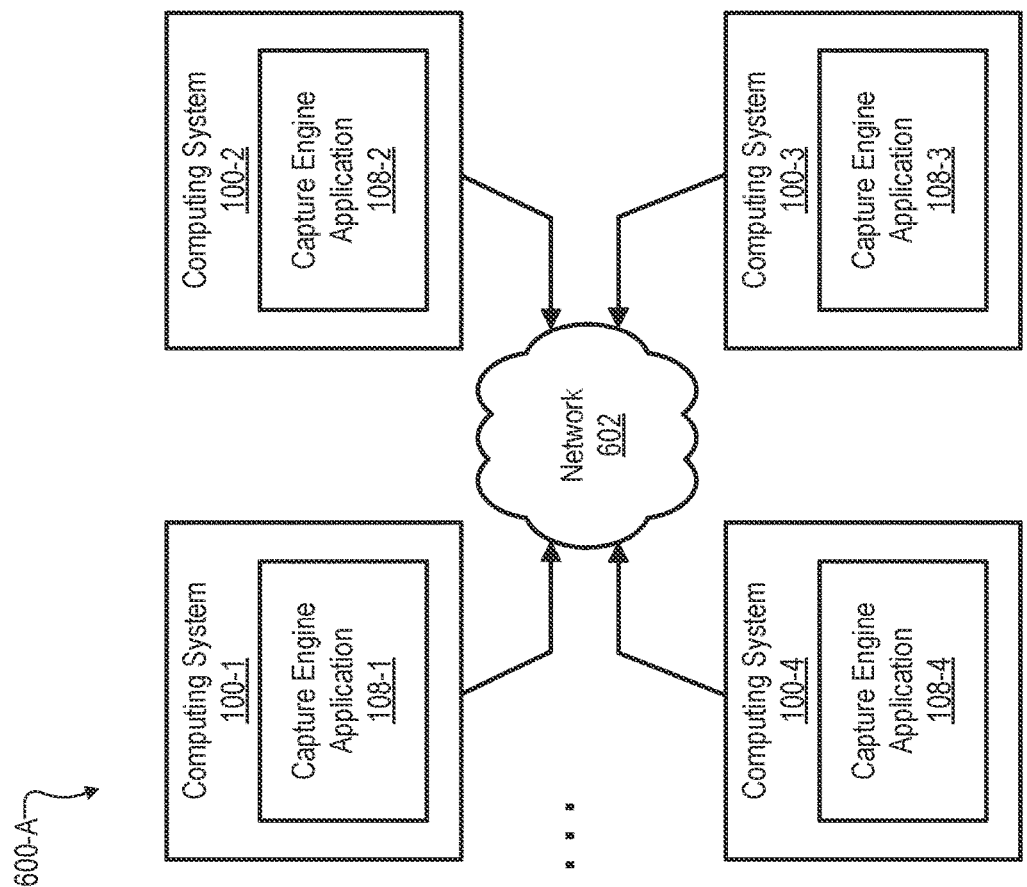

To illustrate a few examples of how this flexibility may come into play, FIGS. 6A-6B show different illustrative deployments of capture engine applications 108 to implementations of computing system 100 configured to execute the capture engine applications. More particularly, in FIG. 6A, a first deployment 600-A shows various distinct computing systems 100-1 through 100-4 (and possibly additional computing systems represented by an ellipsis) that are communicatively coupled by way of a network 602 and each host a different instance of capture engine application 108 (i.e., computing system 100-1 hosting capture engine application 108-1, computing system 100-2 hosting capture engine application 108-2, etc.). In this example, the capture engine application 108-1 thus executes on computing system 100-1, capture engine application 108-2 executes on computing system 100-2, which is distinct from computing system 100-1, and so forth.

In certain implementations, each of these computing systems 100 could be closely associated with one another, such as being different blades in a single blade server, or different servers in a single data center. In these examples, network 602 could represent a relatively localized network such as implemented on a backplane of the blade server or a local area network in the data center. In other implementations, each of these computing systems 100 could be less closely related. For instance, one computing system 100 may be located in one data center in a certain geography (e.g., in the United States) while another computing system 100 could be located in a different data center in a completely different geography (e.g., in a different state or even in another country in a different part of the world). In these examples, network 602 may represent various networks (e.g., the Internet, one or more carrier networks, etc.) that collectively serve to deliver data between these geographically disparate computing systems.

In FIG. 6B, a deployment 600-B shows a single implementation of computing system 100 that is hosting a plurality of different containers 604 (i.e., containers 604-1, 604-2, 604-3, and 604-4) to which respective capture engine applications 108 are deployed (e.g., capture engine application 108-1 in container 604-1, capture engine application 108-2 in container 604-2, etc.). In this example, capture engine application 108-1 will thus be understood to be implemented as a first containerized application executing on this particular implementation of computing system 100, capture engine application 108-2 will be understood to be implemented as a second containerized application executing on this same particular computing system, and so forth. Containers 604 may represent any type of container or other virtualization structure (e.g., virtual machines, etc.) that is used in cloud computing or other distributed architectures to virtualize and optimize the deployment of software applications (e.g., containerized software applications). As such, any type of container platform or technologies may be employed in managing and orchestrating containers 604 and the capture engine applications deployed thereto, and each containerized capture engine application 108 will be understood to be isolated from the other containerized capture engine applications by way of namespace isolation, filesystem isolation, registry isolation, and/or other forms of isolation. In this way, each container 604 and its associated containerized applications may be conveniently moved and/or redeployed in ways that are relatively agnostic to the computing system hardware that the containers run on (since such details are handled by the container architecture and need not be handled by the containerized applications themselves).

It will be understood that a combination deployment using elements of both deployments 600-A and 600-B may be employed in certain implementations. That is, some (but possibly not all) of the capture engine applications in a particular implementation may be implemented as containerized applications such as illustrated in FIG. 6B, but these containerized (and possibly non-containerized) applications may be distributed to a variety of distinct and network-coupled computing systems such as illustrated in FIG. 6A.

Returning to FIG. 5, the image frames provided by the various cameras 302 to their associated capture engine applications 108 are illustrated with uneven spacing within an area labeled as frame receive time 506. This uneven spacing within frame receive time 506 represents jitter with which image frames are generated, transmitted from the cameras, and received by the capture engine applications. For example, though the image frames may have been captured by cameras 302 synchronously (e.g., at the various times represented by camera timestamps CTS 1, CTS 2, etc.), various sources of jitter introduced between the cameras and the capture engine applications (e.g., network delays, different travel times and distances, the computing systems having different priorities and not running real-time operating systems, unexpected events, etc.) may cause the image frames to not necessarily be received synchronously by the various capture engine applications 108. To illustrate, for instance, Frame 2-1 is shown to reach capture engine application 108-2 prior to Frames 1-1 and 3-1 reaching their respective capture engine applications 108-1 and 108-3, but then a longer pause for image data 306-2 in the frame receive time 506 results in Frames 1-2 and 3-2 reaching their respective capture engine applications 108-1 and 108-3 before Frame 2-2 reaches capture engine application 108-2. Since one of the functions of capture engine applications 108 may be to eliminate this jitter for downstream stages of the pipeline, capture engine applications 108 may include jitter buffers (not shown in FIG. 5) to help deal with this jitter and ensure that outgoing frames can be transmitted to the downstream stages in the lock-step, synchronized manner shown in FIG. 5.

Figure 7A:
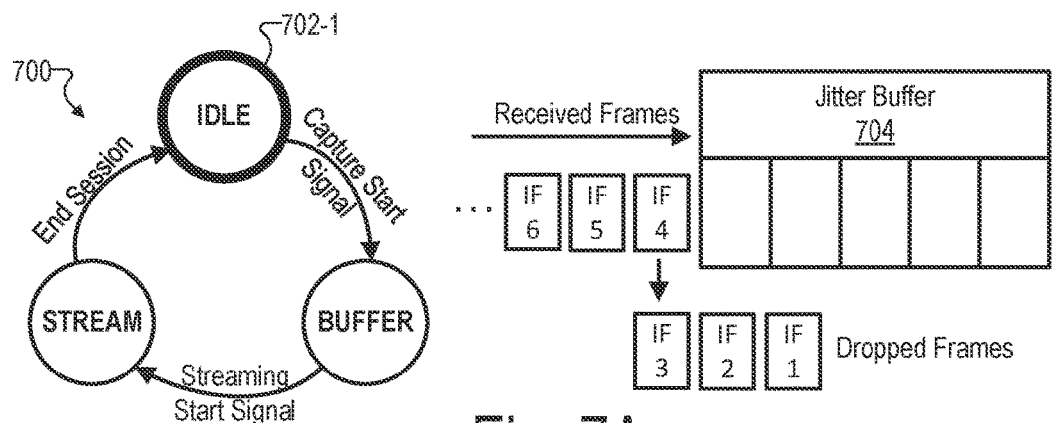
FIGS. 7A-7C show illustrative aspects of how a jitter buffer may be employed by capture engine applications described herein.
Figure 7B:
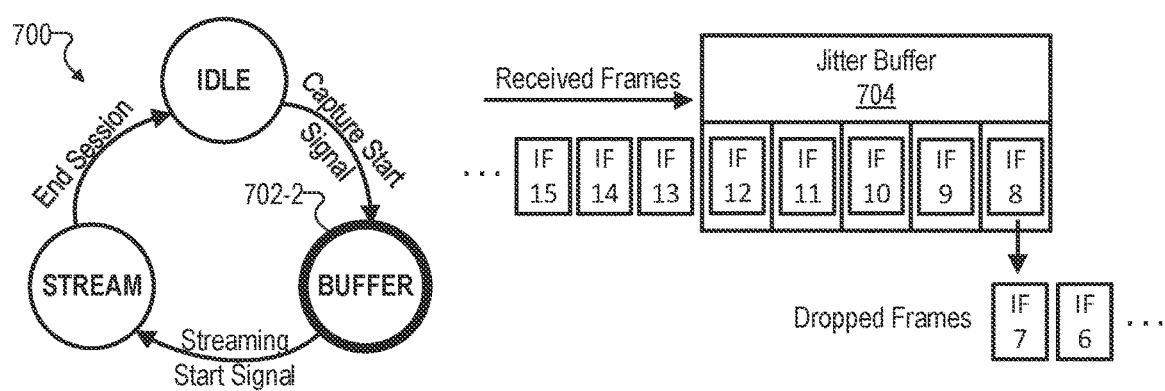
Figure 7C:
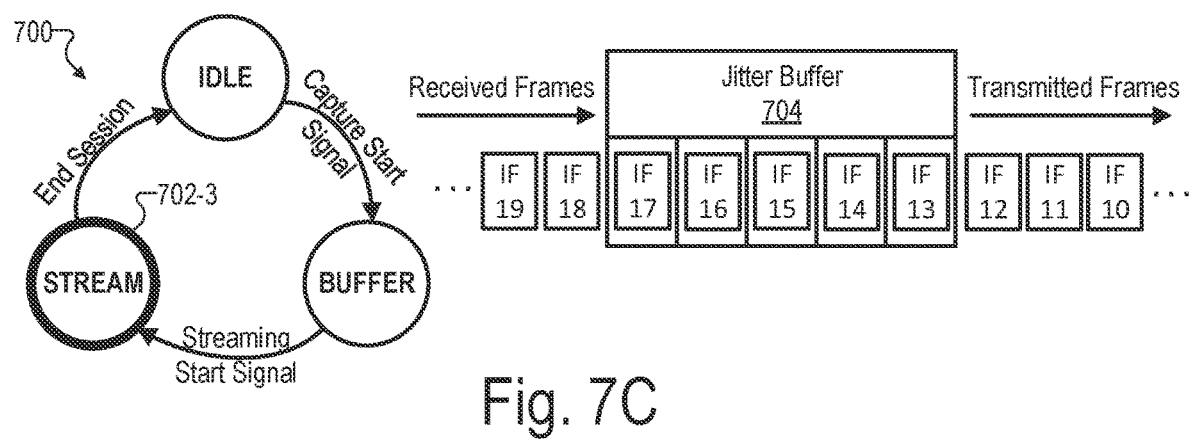

FIGS. 7A-7C show illustrative aspects of how a jitter buffer may be employed by capture engine applications described herein. More particularly, in each of FIGS. 7A-7C, a state diagram 700 is shown with a different one of its states 702 being highlighted (e.g., an IDLE state 702-1 in FIG. 7A, a BUFFER state 702-2 in FIG. 7B, and a STREAM state 702-3 in FIG. 7C) and a corresponding behavior of a stream of image frames (abbreviated "IF" and numbered sequentially 1, 2, 3, etc., in these figures) with respect to a jitter buffer 704.

In FIG. 7A, a capture engine application 108 within which jitter buffer 704 is understood to be implemented is shown to be operating in accordance with IDLE state 702-1. In this state, image frames being received ("Received Frames") by the capture engine application 108 (e.g., IF 1 through IF 6, etc.) are shown to be dropped ("Dropped Frames") as they come in. As such, the image frames are essentially ignored and not yet buffered or transmitted to downstream stages as the camera setup and the various capture engine applications are all coming online and preparing to begin normal operation. Once everything is determined to be ready, the capture engine application may receive a signal (labeled "Capture Start Signal") that causes the state to switch to BUFFER state 702-2, which is illustrated in FIG. 7B.

In FIG. 7B, the capture engine application 108 within which jitter buffer 704 is implemented is shown to be operating in accordance with BUFFER state 702-2. In this state, prior to transmitting any annotated image frames, the various image frames being received ("Received Frames") by the capture engine application 108 (e.g., IF 6 through IF 15) are shown to be buffered in jitter buffer 704 before falling out ("Dropped Frames") when the buffer is full and new received frames come in.

In FIGS. 7A-7C, jitter buffer 704 is shown to have enough storage space to store five image frames (e.g., image frames IF 8 through IF 12 in the moment shown in FIG. 7B). However, it will be understood that the size of jitter buffer 704 may be any suitable size to hold any amount of data (e.g., any number of frames) as may serve a particular implementation. For example, it may be desirable for jitter buffer 704 to hold plenty of image frames so that, when transmitting (in STREAM state 702-3 described below), the capture engine application may be guaranteed to always have an image frame ready for transmission regardless of the amount of jitter or unpredictability associated with when image frames are being received. At the same time, it may also be desirable that jitter buffer 704 not use too much memory so that resources can be used efficiently and there will not be too long of a delay between when image frames are initially captured and received by the capture engine application and when they are transmitted to the next pipeline stage. Accordingly, in some implementations, the size of a jitter buffer such as jitter buffer 704 (i.e., the amount of data able to be stored in the jitter buffer) may be defined with respect to a presentation time associated with image frames stored in the jitter buffer (i.e., defined as an amount of time, in milliseconds or the like, rather than as a number of image frames or a number of bytes, etc.).

Though it may be expected that, over relatively extended periods of time, the number of frames buffered by different jitter buffers 704 of different capture engine applications 108 may be approximately the same, it may be useful for jitter buffer size to be defined in terms of time, rather than frame count, due to the fact that jitter in the capture and/or arrival of the image frames may cause differing numbers of frames to be buffered in different capture engine applications at any given time. Accordingly, for example, rather than allocating enough memory for the five slots shown in jitter buffer 704 per se, a capture engine application may allocate enough memory for an amount of time, in milliseconds or the like, that the incoming image frames are to be presented (i.e., the "presentation time" of the image frames). In this example, the desired amount of presentation time may happen to equate to five image frames.

Once all of the cameras and capture engine applications are online and running (e.g., some time after the capture start signal has been given), the jitter buffers for each capture engine application may be filled (i.e., a certain amount of presentation time may be buffered up) and it may be desirable to begin a synchronized transmission of each set of image frames to downstream pipeline stages that will use the image frames to perform volumetric modeling or other image processing described herein. To this end, the capture engine application 108 within which jitter buffer 704 is implemented may receive a signal (labeled "Streaming Start Signal") that is synchronously provided to all of the capture engine applications 108 may trigger a switching, by the capture engine applications and based on the streaming start signal, of the state of the capture engine applications from the buffering state (BUFFER state 702-2) during which various image frames were received, to a streaming state (STREAM state 702-3) during which these image frames are transmitted.

To illustrate, FIG. 7C shows that the receiving of the streaming start signal during BUFFER state 702-2 leads to the STREAM state 702-3, where all the received image frames ("Received Frames") that come in are buffered through jitter buffer 704 and are then transmitted to the next downstream pipeline stage ("Transmitted Frames") without being dropped. More specifically, example image frames IF 10 through IF 19 are shown in FIG. 7C to be received, pass through jitter buffer 704, and then be forwarded on (i.e., streamed) during this streaming stage. In this way, jitter issues may be resolved and buffered image frames may be ready for transmission at the appropriate times regardless of whether they arrived at shorter or longer intervals than expected based on the frame rate.

Returning to FIG. 5, respective streams of image data 508 analogous to the incoming streams of image data 306 are shown to be output from each capture engine application 108. Specifically, for example, a stream of image data 508-1 is shown to be transmitted from capture engine application 108-1 to downstream pipeline stages ("To Downstream Stages") with the same image frames that arrived in the stream of image data 306-1 (i.e., Frames 1-X). Similarly, a stream of image data 508-2 is shown to be transmitted from capture engine application 108-2 with the same image frames that arrived in the stream of image data 306-2 (i.e., Frame 2-X), and so forth for image data 508-3 and any other streams of image data used in a given implementation.

Whereas the incoming image frames in the streams of image data 306 are shown to include the camera timestamps (i.e., CTS 1 through CTS 3, etc.) and to be received by the capture engine applications 108 asynchronously at various frame receive times 506, the outgoing image frames in the streams of image data 508 are shown to include global timestamps (e.g., based on the camera timestamps and the real time kept by the PTP-synchronized clocks 502) that are labeled "GTS 1," "GTS 2", "GTS 3", and so forth. Moreover, unlike the asynchronous manner in which the frames were received, FIG. 5 shows that the frame transmission times 510 of the image frames are synchronous as the frames are transmitted to the downstream stages. For example, as shown, all of Frames X-1 (e.g., including Frames 1-1, 2-1, and 3-1) are transmitted synchronously at a first transmission time labeled "Transmission Time 1," all of Frames X-2 are transmitted synchronously at a second transmission time labeled "Transmission Time 2," and so forth.

To achieve this synchronicity, each jitter buffer of each capture engine application 108 may be properly filled with captured and buffered image frames and then the streaming start signal may be communicated to and received by each of the capture engine applications 108 (as described above in relation to FIGS. 7B-7C). In this way, each camera and capture engine application may be brought online and started up separately and independently (e.g., at their own pace under whatever circumstances exist in the distributed computing environment) without having any impact on the downstream applications (which synchronously receive the globally timestamped image frames as has been described).

Figure 8:
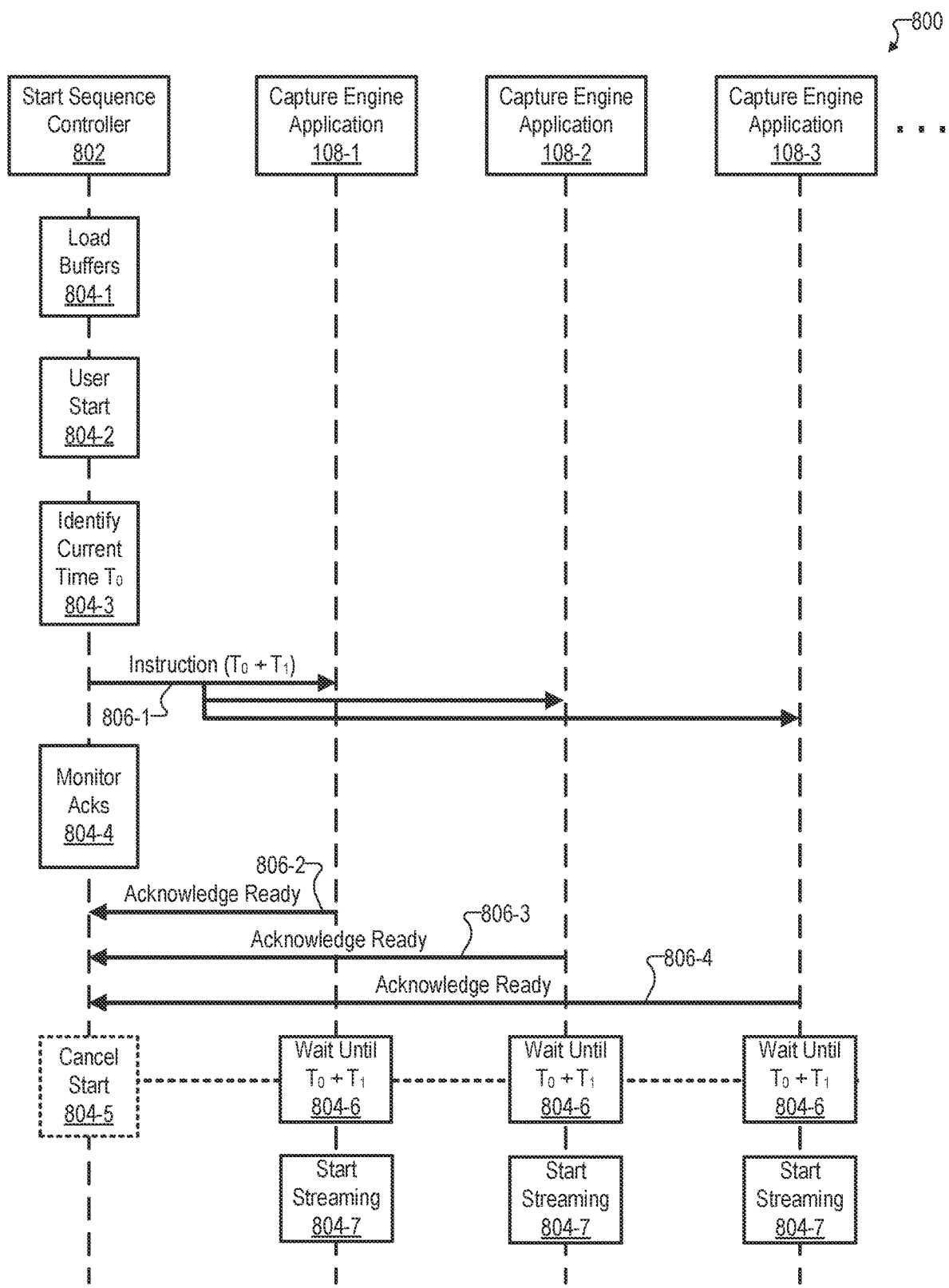
FIG. 8 shows an illustrative dataflow diagram that may be used to synchronize the streaming of image frames by a plurality of capture engine applications described herein.

This synchronization, including the providing and receiving of the streaming start signal that has been described, may be accomplished in any suitable manner as may serve a particular implementation. As one example, FIG. 8 shows an illustrative dataflow diagram 800 that may be used to synchronize the streaming of image frames by capture engine applications described herein. Specifically, for this example, dataflow diagram 800 shows a start sequence controller 802 that coordinates the communication of a streaming start time (e.g., a streaming start signal) to capture engine applications 108-1, 108-2, 108-3, and any other capture engine applications in a given implementation (represented by an ellipsis). As shown, this coordination may involve various operations 804 (e.g., operations 804-1 through 804-7) performed by start sequence controller 802 and/or the capture engine applications 108, as well as various communications 806 (e.g., communications 806-1 through 806-4). Each of operations 804 and communications 806 will now be described in more detail to describe how the streaming start signal may be synchronously provided to each of the capture engine applications 108 by way of a start sequence managed by start sequence controller 802 in this particular example.

At operation 804-1, start sequence controller 802 may direct that capture engine applications 108 load their buffers (or that they at least remain idle while this is done). For example, once each camera 302 and each capture engine application 108 has been started up and initialized (e.g., calibrated, etc.), and once streams of image data 306 are being sent from the cameras to the capture engine applications, start sequence controller 802 may provide the capture start signal (described in relation to FIG. 7A but not explicitly shown in FIG. 8) to the capture engine applications 108 or otherwise cause the jitter buffers to begin loading up as shown in FIG. 7B.

At operation 804-2, start sequence controller 802 may wait for a manual user start signal that is to be provided by a user in certain implementations. In such implementations, the jitter buffers of the various capture engine applications 108 may remain in the BUFFER state 702-2 (running the image frames through the jitter buffer and dropping the oldest frames once the buffer is full to make room for new frames) until the manual user start signal is received. In other implementations, no such user signal may be employed and operation 804-2 would be considered to be complete once all the jitter buffers are known to be sufficiently loaded (e.g., a certain amount of time after the capture start signal is provided).

At operation 804-3, start sequence controller 802 may identify a current time (referred to in FIG. 8 as $T_0$) in global time domain 310 to which the various clocks 502 are synchronized. For example, start sequence controller 802 may use one of clocks 502 (e.g., if start sequence controller 802 is implemented by one of the same computing systems 100 implementing one or more of the capture engine applications 108) or another clock that is likewise synchronized (e.g., by way of PTP) to the same global time domain.

Based on this identified time $T_0$, start sequence controller 802 may then provide communication 806-1 to each of the capture engine applications 108. As shown, communication 806-1 may include sending an instruction to each of the capture engine applications 108 to indicate that the switching of the state to the streaming state (i.e., from BUFFER state 702-2 to STREAM state 702-3) is to occur at a particular future time designated with respect to the current time $T_0$. For example, a predetermined time interval $T_1$ (e.g., 10 seconds, etc.) may be designated and added to the current time $T_0$ in the instructions sent by communication 806-1. As will be described below, as long as everything goes as expected and the start sequence is not canceled (according to a cancelation operation described below), the instruction sent in communication 806-1 may direct all of the capture engine applications 108 to synchronously begin streaming at a streaming start time that is $T_1$ time units (e.g., seconds) after current time $T_0$.

At operation 804-4, start sequence controller 802 may be configured to monitor for acknowledgement messages received from each of the capture engine applications 108 in response to the instruction of communication 806-1. In other words, at operation 804-4, start sequence controller 802 may begin waiting, for up to a preestablished amount of time (e.g., for up to 9 seconds after communication 806-1 was sent if the time interval $T_1$ is 10 seconds, etc.), to get confirmation from each of the capture engine applications 108 that they received communication 806-1 and are ready to begin transmitting at the designated stream start time (i.e., $T_0+T_1$).

In this example, it is shown that each of capture engine applications 108-1 through 108-3 do respond with an acknowledgement during the monitoring time period associated with operation 804-4. Specifically, as shown, capture engine application 108-1 provides communication 806-2 to indicate that capture engine application 108-1 is ready to begin streaming, capture engine application 108-2 provides communication 806-3 to indicate that capture engine application 108-2 is ready to begin streaming, and capture engine application 108-3 provides communication 806-4 to indicate that capture engine application 108-4 is ready to begin streaming. It will be understood that, if other capture engine applications are also present (not shown in FIG. 8), similar acknowledgement communications may similarly be received.

Operation 804-5 is shown to be outlined with a dotted line, rather than a solid line like the other operations 804. This is because operation 804-5 is a contingent operation that does not actually occur in the present example, but that would occur if one or more of the acknowledgement messages were not to be received during the monitoring time period from one of the capture engine applications 108. For instance, if communication 806-4 had not been provided in time by capture engine application 108-3, operation 804-5 would be performed to cancel the start sequence by, for example, sending another communication to the capture engine applications 108 indicating that the start sequence is canceled and that they should stand by (e.g., either in the IDLE state 702-1 or the BUFFER state 702-2) until receiving further instruction (e.g., another instruction similar to the one in communication 806-1 in which a new start time is designated). In the event that operation 804-5 is performed and the cancel signal (not shown) is sent, start sequence controller 802 may then be configured to return to one of operations 804-1, 804-2, or 804-3 to attempt again to successfully perform the streaming start sequence. In some examples, some manual troubleshooting by a user may be performed (e.g., to determine the cause of the failure of one or more of the capture engine applications to provide the acknowledgement messages within the monitoring timeframe) prior to the next streaming start sequence attempt.

Operations 804-6 are shown to be parallel operations performed by each of capture engine applications 108 after sending their respective acknowledgement messages (at communications 806-2 through 806-4). The dotted line extending from operation 804-5 to operations 804-6 indicates that operations 804-6 are performed as an alternative to (rather than in addition to) operation 804-5 since, in this example, each of the acknowledgement messages were indeed successfully sent and received. At operations 804-6, the capture engine applications 108 wait until the designated time indicated in the instruction of communication 806-1 (i.e., the time occurring at $T_0+T_1$).

Then, at operations 804-7 (which are also shown to be parallel operations performed by each of capture engine applications 108), the capture engine applications 108 may begin streaming the buffered image frames to the downstream pipeline stages. In other words, without further communication from start sequence controller 802, each of the capture engine applications 108 may synchronously switch to STREAM state 702-3 and begin transmitting, in the synchronous manner shown in FIG. 5, the image frames that they are buffering. When respective acknowledgement messages are received from each of the relevant capture engine applications (e.g., capture engine applications 108-1 through 108-3 in this example), the streaming start signal described in relation to FIG. 7C (which triggers the synchronous frame transmission to begin) may be deemed to be synchronously provided to the first and second capture engine applications at the future time (i.e., the time indicated by $T_0+T_1$ in communication 806-1). As such, in this example implementation, no physical streaming start signal (e.g., no electrical signal, etc.) may actually be present. Rather, the signal may be considered to have been provided at the moment that the particular start time arrives as long as sequence cancelation (i.e., operation 804-5) has not occurred first. In other implementations, it will be understood that a more physical streaming start signal (e.g., an additional communication sent by start sequence controller that is configured in some manner to arrive at each capture engine application 108 simultaneously) could alternatively be used.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium (e.g., a memory, etc.), and executes those instructions, thereby performing one or more operations such as the operations described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random-access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 9:
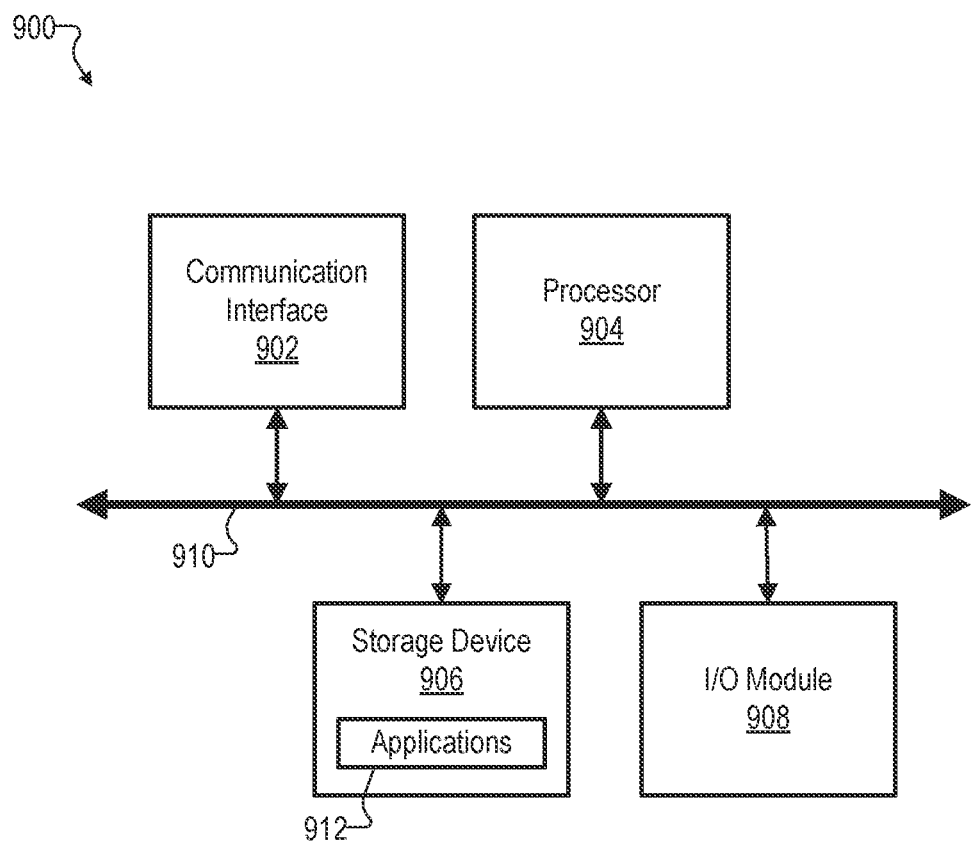
FIG. 9 shows an illustrative computing device that may implement certain of the computing systems and devices described herein.

FIG. 9 shows an illustrative computing device 900 that may implement certain of the computing systems and devices described herein. For example, computing device 900 may implement computing system 100, a component thereof, or any other computing device described herein.

As shown in FIG. 9, computing device 900 may include a communication interface 902, a processor 904, a storage device 906, and an input/output (I/O) module 908 communicatively connected via a communication infrastructure 910. While an illustrative computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 906. For example, data representative of one or more executable applications 912 configured to direct processor 904 to perform any of the operations described herein may be stored within storage device 906. In some examples, data may be arranged in one or more databases residing within storage device 906.

I/O module 908 may include one or more I/O modules configured to receive user input and provide user output. One or more I/O modules may be used to receive input for a single virtual experience. I/O module 908 may include any hardware, firmware, software, or combination thereof supportive of input and output capabilities. For example, I/O module 908 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 900. For example, one or more applications 912 residing within storage device 906 may be configured to direct processor 904 to perform one or more processes or functions associated with processor 104 of computing system 100. Likewise, memory 102 of computing system 100 may be implemented by or within storage device 906.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

In the preceding description, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
synchronizing, by a first capture engine application, a first clock used by the first capture engine application to a global time domain to which a second clock used by a second capture engine application is also synchronized;
receiving, by the first capture engine application, a first image frame captured by a first camera of a camera array configured to capture image data for a scene, the first image frame having a camera timestamp indicating a capture time of the first image frame with respect to a camera time domain used by the camera array;
annotating, by the first capture engine application and based on the camera timestamp and the synchronized first clock, the first image frame with a global timestamp indicating the capture time of the first image frame with respect to the global time domain; and
transmitting, by the first capture engine application, the annotated first image frame at a transmission time at which the second capture engine application synchronously transmits a second image frame that is annotated with the global timestamp and is captured by a second camera of the camera array, wherein the first and second capture engine applications synchronously transmit the annotated first and second image frames, respectively, based on a streaming start signal received by the first and second capture engine applications.

2. The method of claim 1, wherein:
each individual camera in the camera array is associated with a different respective capture engine application configured to receive and annotate capture data generated by the individual camera;
the first camera is associated with the first capture engine application; and
the second camera is associated with the second capture engine application.

3. The method of claim 1, wherein:
the first capture engine application executes on a first computing system; and
the second capture engine application executes on a second computing system distinct from the first computing system.

4. The method of claim 1, wherein:
the first capture engine application is implemented as a first containerized application executing on a particular computing system; and
the second capture engine application is implemented as a second containerized application executing on the particular computing system and isolated from the first containerized application by way of at least one of namespace isolation, filesystem isolation, or registry isolation.

5. The method of claim 1, further comprising:
buffering, by the first capture engine application and prior to transmitting the annotated first image frame, the first image frame together with a plurality of other image frames captured by the first camera; and
switching, by the first capture engine application and based on the streaming start signal that is synchronously provided to the first and second capture engine applications, a state of the first capture engine application from:
a buffering state during which the first image frame is received, to
a streaming state during which the first image frame and the plurality of other image frames captured by the first camera are transmitted.

6. The method of claim 5, wherein:
the buffering of the first image frame together with the plurality of other image frames captured by the first camera is performed using a jitter buffer implemented by the first capture engine application; and
a size of the jitter buffer is defined with respect to a presentation time associated with image frames stored in the jitter buffer.

7. The method of claim 5, wherein:
the streaming start signal is synchronously provided to the first and second capture engine applications by way of a start sequence managed by a start sequence controller, the start sequence comprising:
identifying a current time in the global time domain to which the first and second clocks are synchronized,
sending an instruction to the first and second capture engine applications that the switching of the state to the streaming state is to occur at a future time designated with respect to the current time, and
monitoring for acknowledgement messages received from the first and second capture engine applications in response to the instruction; and
when respective acknowledgement messages are received from each of the first and second capture engine applications, the streaming start signal is deemed to be synchronously provided to the first and second capture engine applications at the future time.

8. The method of claim 1, wherein:
the transmitting of the annotated first image frame by the first capture engine application includes transmitting the annotated first image frame from a first stage of an image processing pipeline to one or more downstream stages of the image processing pipeline;
the first and second capture engine applications are associated with the first stage of the image processing pipeline; and
one or more image analysis applications distinct from the first and second capture engine applications are associated with the one or more downstream stages of the image processing pipeline.

9. The method of claim 8, wherein the one or more image analysis applications associated with the one or more downstream stages include:
a volumetric modeling application configured to generate, based on the image data captured by the camera array, one or more volumetric models associated with the scene, the volumetric modeling application managed by a first entity that also manages the first and second capture engine applications; and
a virtual production application configured to generate virtual objects to be integrated with the one or more volumetric models in an extended reality experience presented to a user, the virtual production application managed by a second entity different from the first entity.

10. The method of claim 1, wherein the synchronizing of the first clock to the global time domain is performed using Precision Time Protocol (PTP) and the global timestamp is implemented as a PTP timestamp representing the capture time as a real time indicating a date and time of day.

11. The method of claim 10, wherein the PTP timestamp indicates the capture time with sub-microsecond precision.

12. The method of claim 1, wherein the streaming start signal indicates the transmission time with respect to the global time domain.

13. A system comprising:
a memory storing instructions; and
one or more processors comprising computer hardware, the one or more processors communicatively coupled to the memory and configured to execute the instructions to implement a first capture engine application configured to perform a process comprising:
synchronizing a first clock used by the first capture engine application to a global time domain to which a second clock used by a second capture engine application is also synchronized;
receiving a first image frame captured by a first camera of a camera array configured to capture image data for a scene, the first image frame having a camera timestamp indicating a capture time of the first image frame with respect to a camera time domain used by the camera array;
annotating, based on the camera timestamp and the synchronized first clock, the first image frame with a global timestamp indicating the capture time of the first image frame with respect to the global time domain; and
transmitting the annotated first image frame at a transmission time at which the second capture engine application synchronously transmits a second image frame that is annotated with the global timestamp and is captured by a second camera of the camera array, wherein the first and second capture engine applications synchronously transmit the annotated first and second image frames, respectively, based on a streaming start signal received by the first and second capture engine applications.

14. The system of claim 13, wherein:
each individual camera in the camera array is associated with a different respective capture engine application configured to receive and annotate capture data generated by the individual camera;
the first camera is associated with the first capture engine application and the first capture engine application executes on a first computing system; and
the second camera is associated with the second capture engine application and the second capture engine application executes on a second computing system distinct from the first computing system.

15. The system of claim 13, wherein the process further comprises:
buffering, prior to transmitting the annotated first image frame, the first image frame together with a plurality of other image frames captured by the first camera; and
switching, based on the streaming start signal that is synchronously provided to the first and second capture engine applications, a state of the first capture engine application from:
a buffering state during which the first image frame is received, to
a streaming state during which the first image frame and the plurality of other image frames captured by the first camera are transmitted.

16. The system of claim 15, wherein:
the buffering of the first image frame together with the plurality of other image frames captured by the first camera is performed using a jitter buffer implemented by the first capture engine application; and
a size of the jitter buffer is defined with respect to a presentation time associated with image frames stored in the jitter buffer.

17. The system of claim 15, wherein:
the streaming start signal is synchronously provided to the first and second capture engine applications by way of a start sequence managed by a start sequence controller, the start sequence comprising:
identifying a current time in the global time domain to which the first and second clocks are synchronized,
sending an instruction to the first and second capture engine applications that the switching of the state to the streaming state is to occur at a future time designated with respect to the current time, and
monitoring for acknowledgement messages received from the first and second capture engine applications in response to the instruction; and
when respective acknowledgement messages are received from each of the first and second capture engine applications, the streaming start signal is deemed to be synchronously provided to the first and second capture engine applications at the future time.

18. The system of claim 13, wherein:
the transmitting of the annotated first image frame by the first capture engine application includes transmitting the annotated first image frame from a first stage of an image processing pipeline to one or more downstream stages of the image processing pipeline;
the first and second capture engine applications are associated with the first stage of the image processing pipeline; and
one or more image analysis applications distinct from the first and second capture engine applications are associated with the one or more downstream stages of the image processing pipeline.

19. The system of claim 18, wherein the one or more image analysis applications associated with the one or more downstream stages include:
a volumetric modeling application configured to generate, based on the image data captured by the camera array, one or more volumetric models associated with the scene, the volumetric modeling application managed by a first entity that also manages the first and second capture engine applications; and
a virtual production application configured to generate virtual objects to be integrated with the one or more volumetric models in an extended reality experience presented to a user, the virtual production application managed by a second entity different from the first entity.

20. A non-transitory computer-readable medium storing instructions that, when executed, direct a processor of a computing device to implement a first capture engine application configured to perform a process comprising:
synchronizing a first clock used by the first capture engine application to a global time domain to which a second clock used by a second capture engine application is also synchronized;
receiving a first image frame captured by a first camera of a camera array configured to capture image data for a scene, the first image frame having a camera timestamp indicating a capture time of the first image frame with respect to a camera time domain used by the camera array;
annotating, based on the camera timestamp and the synchronized first clock, the first image frame with a global timestamp indicating the capture time of the first image frame with respect to the global time domain; and
transmitting the annotated first image frame at a transmission time at which the second capture engine application synchronously transmits a second image frame that is annotated with the global timestamp and is captured by a second camera of the camera array, wherein the first and second capture engine applications synchronously transmit the annotated first and second image frames, respectively, based on a streaming start signal received by the first and second capture engine applications.

* * * * *